(12) United States Patent
Marcinkiewicz et al.

(10) Patent No.: US 9,088,232 B2
(45) Date of Patent: Jul. 21, 2015

(54) POWER FACTOR CORRECTION WITH VARIABLE BUS VOLTAGE

(71) Applicant: Emerson Climate Technologies, Inc., Sidney, OH (US)

(72) Inventors: Joseph G. Marcinkiewicz, St. Peters, MO (US); James L. Skinner, Collinsvile, IL (US); Charles E. Green, Fenton, MO (US); John P. Powers, St. Louis, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 13/964,595

(22) Filed: Aug. 12, 2013

(65) Prior Publication Data
US 2014/0152209 A1    Jun. 5, 2014

Related U.S. Application Data

(63) Continuation of application No. 12/852,557, filed on Aug. 9, 2010, now Pat. No. 8,508,166.

(60) Provisional application No. 61/232,754, filed on Aug. 10, 2009.

(51) Int. Cl.
*G05F 1/70* (2006.01)
*H02P 6/08* (2006.01)
(Continued)

(52) U.S. Cl.
CPC ............... *H02P 6/08* (2013.01); *H02M 1/4225* (2013.01); *H02P 23/0081* (2013.01); *H02M 2001/008* (2013.01); *Y02B 70/126* (2013.01)

(58) Field of Classification Search
USPC .................................. 318/438, 729; 323/205
See application file for complete search history.

(56) References Cited

U.S. PATENT DOCUMENTS

| 4,364,237 A | 12/1982 | Cooper et al. |
| 4,370,564 A | 1/1983 | Matsushita |

(Continued)

FOREIGN PATENT DOCUMENTS

| CN | 1240058 A | 12/1999 |
| CN | 1293885 A | 5/2001 |

(Continued)

OTHER PUBLICATIONS

International Search Report regarding Application No. PCT/US2013/054359, mailed Nov. 22, 2013.

(Continued)

*Primary Examiner* — Bentsu Ro
(74) *Attorney, Agent, or Firm* — Harness, Dickey & Pierce, P.L.C.

(57) ABSTRACT

A controller includes a voltage determination module, a bus voltage command module, and a power factor correction (PFC) control module. The voltage determination module determines a desired direct current (DC) bus voltage for a DC bus electrically connected between a PFC module and an inverter power module that drives a motor. The voltage determination module determines the desired DC bus voltage based on at least one of torque of the motor and speed of the motor. The bus voltage command module determines a commanded bus voltage based on the desired DC bus voltage. The PFC control module controls the PFC module to create a voltage on the DC bus that is based on the commanded bus voltage.

15 Claims, 12 Drawing Sheets

(51) Int. Cl.
  *H02M 1/42* (2007.01)
  *H02P 23/00* (2006.01)
  *H02M 1/00* (2007.01)

(56) References Cited

U.S. PATENT DOCUMENTS

| | | | |
|---|---|---|---|
| 4,428,016 A | 1/1984 | Brasfield | |
| 4,524,316 A | 6/1985 | Brown et al. | |
| 4,662,185 A | 5/1987 | Kobayashi et al. | |
| 4,672,298 A | 6/1987 | Rohatyn | |
| 4,769,587 A | 9/1988 | Pettigrew | |
| 4,866,588 A | 9/1989 | Rene | |
| 4,940,929 A | 7/1990 | Williams | |
| 5,064,356 A | 11/1991 | Horn | |
| 5,187,417 A | 2/1993 | Minnich et al. | |
| 5,224,025 A | 6/1993 | Divan et al. | |
| 5,320,506 A | 6/1994 | Fogt | |
| 5,359,281 A | 10/1994 | Barrow et al. | |
| 5,371,666 A | 12/1994 | Miller | |
| 5,383,109 A | 1/1995 | Maksimovic et al. | |
| 5,451,832 A | 9/1995 | Cameron et al. | |
| 5,457,375 A | 10/1995 | Marcinkiewicz et al. | |
| 5,461,263 A | 10/1995 | Helfrich | |
| 5,471,117 A | 11/1995 | Ranganath et al. | |
| 5,483,136 A | 1/1996 | Marcinkiewicz | |
| 5,502,370 A | 3/1996 | Hall et al. | |
| 5,502,630 A | 3/1996 | Rokhvarg | |
| 5,511,202 A | 4/1996 | Combs et al. | |
| 5,541,484 A | 7/1996 | DiTucci | |
| 5,563,781 A | 10/1996 | Clauter et al. | |
| 5,565,752 A | 10/1996 | Jansen et al. | |
| 5,576,941 A | 11/1996 | Nguyen et al. | |
| 5,602,465 A | 2/1997 | Clemente | |
| 5,604,385 A | 2/1997 | David | |
| 5,605,053 A | 2/1997 | Otori | |
| 5,606,950 A | 3/1997 | Fujiwara et al. | |
| 5,615,097 A | 3/1997 | Cross | |
| 5,617,013 A | 4/1997 | Cozzi | |
| 5,631,550 A | 5/1997 | Castro et al. | |
| 5,637,974 A | 6/1997 | McCann | |
| 5,656,915 A | 8/1997 | Eaves | |
| 5,682,306 A | 10/1997 | Jansen | |
| 5,742,151 A | 4/1998 | Hwang | |
| 5,742,493 A | 4/1998 | Ito et al. | |
| 5,786,992 A | 7/1998 | Vinciarelli et al. | |
| 5,793,168 A | 8/1998 | Vitunic | |
| 5,801,935 A | 9/1998 | Sugden et al. | |
| 5,838,124 A | 11/1998 | Hill | |
| 5,867,379 A | 2/1999 | Maksimovic et al. | |
| 5,877,660 A | 3/1999 | Ebine et al. | |
| 5,917,864 A | 6/1999 | Asahara | |
| 5,949,204 A | 9/1999 | Huggett et al. | |
| 5,955,847 A | 9/1999 | Rothenbuhler | |
| 5,960,207 A | 9/1999 | Brown | |
| 5,970,727 A | 10/1999 | Hiraoka et al. | |
| 5,977,660 A | 11/1999 | Mandalakas et al. | |
| 6,018,203 A | 1/2000 | David et al. | |
| 6,026,006 A | 2/2000 | Jiang et al. | |
| 6,031,751 A | 2/2000 | Janko | |
| 6,041,609 A | 3/2000 | Hornsleth et al. | |
| 6,065,298 A | 5/2000 | Fujimoto | |
| 6,091,215 A | 7/2000 | Lovett et al. | |
| 6,091,233 A | 7/2000 | Hwang et al. | |
| 6,109,048 A | 8/2000 | Kim | |
| 6,116,040 A | 9/2000 | Stark | |
| 6,181,120 B1 | 1/2001 | Hawkes et al. | |
| 6,184,630 B1 | 2/2001 | Qian et al. | |
| 6,198,240 B1 | 3/2001 | Notohara et al. | |
| 6,225,767 B1 | 5/2001 | Lovett et al. | |
| 6,232,734 B1 | 5/2001 | Anzai | |
| 6,256,213 B1 | 7/2001 | Illingworth | |
| 6,326,750 B1 | 12/2001 | Marcinkiewicz | |
| 6,366,070 B1 | 4/2002 | Cooke et al. | |
| 6,373,734 B1 | 4/2002 | Martinelli | |
| 6,388,905 B2 | 5/2002 | Nakagawa | |
| 6,392,418 B1 | 5/2002 | Mir et al. | |
| 6,396,229 B1 | 5/2002 | Sakamoto et al. | |
| 6,404,154 B2 | 6/2002 | Marcinkiewicz et al. | |
| 6,411,065 B1 | 6/2002 | Underwood et al. | |
| 6,424,107 B1 | 7/2002 | Lu | |
| 6,429,673 B1 | 8/2002 | Obata et al. | |
| 6,441,580 B2 | 8/2002 | Marcinkiewicz | |
| 6,462,491 B1 | 10/2002 | Iijima et al. | |
| 6,462,974 B1 | 10/2002 | Jadric | |
| 6,467,289 B2 | 10/2002 | Kuroki et al. | |
| 6,483,270 B1 | 11/2002 | Miyazaki et al. | |
| 6,501,240 B2 | 12/2002 | Ueda et al. | |
| 6,523,361 B2 | 2/2003 | Higashiyama | |
| 6,594,158 B2 | 7/2003 | Batarseh et al. | |
| 6,611,117 B1 | 8/2003 | Hardt | |
| 6,619,062 B1 | 9/2003 | Shibamoto et al. | |
| 6,630,806 B1 | 10/2003 | Brits et al. | |
| 6,639,377 B2 | 10/2003 | Iwaji et al. | |
| 6,644,980 B2 | 11/2003 | Kameda | |
| 6,657,877 B2 | 12/2003 | Kashima et al. | |
| 6,690,137 B2 | 2/2004 | Iwaji et al. | |
| 6,727,668 B1 | 4/2004 | Maslov et al. | |
| 6,731,083 B2 | 5/2004 | Marcinkiewicz | |
| 6,735,284 B2 | 5/2004 | Cheong et al. | |
| 6,756,753 B1 | 6/2004 | Marcinkiewicz | |
| 6,756,757 B2 | 6/2004 | Marcinkiewicz et al. | |
| 6,757,185 B2 | 6/2004 | Rojas Romero | |
| 6,771,522 B2 | 8/2004 | Hayashi et al. | |
| 6,772,603 B2 | 8/2004 | Hsu et al. | |
| 6,822,416 B1 | 11/2004 | Kunz et al. | |
| 6,825,637 B2 | 11/2004 | Kinpara et al. | |
| 6,828,751 B2 | 12/2004 | Sadasivam et al. | |
| 6,873,504 B2 | 3/2005 | Lifson et al. | |
| 6,912,142 B2 | 6/2005 | Keim et al. | |
| 6,925,823 B2 | 8/2005 | Lifson et al. | |
| 6,927,553 B2 | 8/2005 | Chen | |
| 6,947,504 B1 | 9/2005 | Pettit | |
| 6,973,794 B2 | 12/2005 | Street et al. | |
| 6,984,948 B2 | 1/2006 | Nakata et al. | |
| 7,000,422 B2 | 2/2006 | Street et al. | |
| 7,042,180 B2 | 5/2006 | Terry et al. | |
| 7,051,542 B2 | 5/2006 | Chen et al. | |
| 7,061,212 B2 | 6/2006 | Phadke | |
| 7,068,016 B2 | 6/2006 | Athari | |
| 7,071,641 B2 | 7/2006 | Arai et al. | |
| 7,088,081 B2 | 8/2006 | Takahashi et al. | |
| 7,088,881 B2 | 8/2006 | Nir | |
| 7,102,305 B2 | 9/2006 | Suzuki | |
| 7,133,602 B2 | 11/2006 | Yamada | |
| 7,148,664 B2 | 12/2006 | Takahashi et al. | |
| 7,151,359 B2 | 12/2006 | Randall et al. | |
| 7,164,590 B2 | 1/2007 | Li et al. | |
| 7,164,591 B2 | 1/2007 | Soldano | |
| 7,176,644 B2 | 2/2007 | Ueda et al. | |
| 7,183,734 B2 | 2/2007 | Lassen | |
| 7,193,388 B1 | 3/2007 | Skinner et al. | |
| 7,208,895 B2 | 4/2007 | Marcinkiewicz et al. | |
| 7,242,163 B2 | 7/2007 | Gallegos-Lopez et al. | |
| 7,262,569 B2 | 8/2007 | Douglas | |
| 7,266,001 B1 | 9/2007 | Notohamiprodjo et al. | |
| 7,295,452 B1 | 11/2007 | Liu | |
| 7,320,225 B2 | 1/2008 | Street et al. | |
| 7,342,379 B2 | 3/2008 | Marcinkiewicz et al. | |
| 7,348,756 B2 | 3/2008 | Ma et al. | |
| 7,352,151 B2 | 4/2008 | Fujitsuna et al. | |
| 7,359,224 B2 | 4/2008 | Li | |
| 7,375,485 B2 | 5/2008 | Shahi et al. | |
| 7,388,340 B2 | 6/2008 | Nojima | |
| 7,391,181 B2 | 6/2008 | Welchko et al. | |
| 7,392,158 B2 | 6/2008 | Hikawa et al. | |
| 7,403,404 B2 | 7/2008 | Oka et al. | |
| 7,420,351 B2 * | 9/2008 | Grbovic | 318/772 |
| 7,459,874 B2 | 12/2008 | Bae et al. | |
| 7,495,410 B2 | 2/2009 | Zargari et al. | |
| 7,501,776 B2 | 3/2009 | Lee et al. | |
| 7,504,797 B2 | 3/2009 | Tomigashi et al. | |
| 7,570,002 B2 | 8/2009 | Peng | |
| 7,583,049 B2 | 9/2009 | Marcinkiewicz et al. | |
| 7,586,286 B2 | 9/2009 | Cheng et al. | |

(56) References Cited

U.S. PATENT DOCUMENTS

| | | |
|---|---|---|
| 7,591,038 B2 | 9/2009 | Murray et al. |
| 7,595,613 B2 | 9/2009 | Thompson et al. |
| 7,615,891 B2 | 11/2009 | Wu et al. |
| 7,619,380 B2 | 11/2009 | Lo et al. |
| 7,619,385 B2 | 11/2009 | Suzuki et al. |
| 7,626,349 B2 | 12/2009 | Marcinkiewicz et al. |
| 7,638,967 B2 | 12/2009 | Aizawa et al. |
| 7,667,423 B2 | 2/2010 | Shahi et al. |
| 7,667,986 B2 | 2/2010 | Artusi et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,694,538 B2 | 4/2010 | Thorn et al. |
| 7,733,044 B2 | 6/2010 | Nakamura et al. |
| 7,759,886 B2 | 7/2010 | Gallegos-Lopez et al. |
| 7,770,806 B2 | 8/2010 | Herzon et al. |
| 7,796,389 B2 | 9/2010 | Edmunds et al. |
| 7,834,573 B2 | 11/2010 | Lindsey et al. |
| 7,843,155 B2 | 11/2010 | Rozman et al. |
| 7,854,137 B2 | 12/2010 | Lifson et al. |
| 7,888,881 B2 | 2/2011 | Shteynberg et al. |
| 7,898,197 B2 | 3/2011 | Tomigashi |
| 7,905,122 B2 | 3/2011 | Murray et al. |
| 7,908,893 B2 | 3/2011 | Thorn et al. |
| 7,923,953 B2 | 4/2011 | Gallegos-Lopez et al. |
| 7,940,020 B2 | 5/2011 | Brown |
| 7,969,125 B2 | 6/2011 | Melanson |
| 8,041,524 B2 | 10/2011 | Tan et al. |
| 8,044,618 B2 | 10/2011 | Nakatsugawa et al. |
| 8,058,824 B2 | 11/2011 | Williams et al. |
| 8,058,825 B2 | 11/2011 | Dornhof |
| 8,089,240 B2 | 1/2012 | Lee |
| 8,115,428 B2 | 2/2012 | Williams et al. |
| 8,120,298 B2 | 2/2012 | Lelkes |
| 8,146,377 B2 | 4/2012 | Karamanos |
| 8,148,928 B2 | 4/2012 | Laulanet et al. |
| 8,159,161 B2 | 4/2012 | Tomigashi |
| 8,169,180 B2 | 5/2012 | Hwang et al. |
| 8,188,700 B2 | 5/2012 | Tseng et al. |
| 8,242,727 B2 | 8/2012 | Sultenfuss et al. |
| 8,258,731 B2 | 9/2012 | Shimizu |
| 8,264,192 B2 | 9/2012 | Green et al. |
| 8,264,619 B2 | 9/2012 | Lowe |
| 8,264,860 B2 | 9/2012 | Green |
| 8,294,401 B2 | 10/2012 | Pollock et al. |
| 8,324,768 B2 | 12/2012 | Nakano et al. |
| 8,344,706 B2 | 1/2013 | Green |
| 8,358,098 B2 | 1/2013 | Skinner et al. |
| 8,406,021 B2 | 3/2013 | Green |
| 8,476,873 B2 | 7/2013 | Green |
| 8,493,014 B2 | 7/2013 | Henderson et al. |
| 8,508,166 B2 | 8/2013 | Marcinkiewicz et al. |
| 8,547,051 B2 | 10/2013 | Green et al. |
| 2001/0005320 A1 | 6/2001 | Ueda et al. |
| 2002/0057080 A1 | 5/2002 | Telefus et al. |
| 2002/0145837 A1 | 10/2002 | Krefta et al. |
| 2002/0149953 A1 | 10/2002 | Smedley et al. |
| 2003/0052640 A1 | 3/2003 | Iwaji et al. |
| 2003/0057912 A1 | 3/2003 | Iwaji et al. |
| 2003/0218444 A1 | 11/2003 | Marcinkiewicz et al. |
| 2004/0211009 A1 | 10/2004 | Murray et al. |
| 2004/0239296 A1 | 12/2004 | Turchi |
| 2004/0257028 A1 | 12/2004 | Schulz et al. |
| 2005/0030772 A1 | 2/2005 | Phadke |
| 2005/0046370 A1 | 3/2005 | Gallegos-Lopez et al. |
| 2005/0187752 A1 | 8/2005 | Colby et al. |
| 2005/0204482 A1 | 9/2005 | Murray et al. |
| 2005/0253546 A1 | 11/2005 | Dornhof |
| 2006/0013024 A1 | 1/2006 | Temesi et al. |
| 2006/0097688 A1 | 5/2006 | Patel et al. |
| 2006/0125427 A1 | 6/2006 | Kishibe et al. |
| 2006/0130504 A1 | 6/2006 | Agrawal et al. |
| 2006/0198172 A1 | 9/2006 | Wood |
| 2006/0290302 A1 | 12/2006 | Marcinkiewicz et al. |
| 2006/0290304 A1 | 12/2006 | Marcinkiewicz et al. |
| 2007/0120519 A1 | 5/2007 | Sakamoto et al. |
| 2007/0170880 A1 | 7/2007 | Shahi et al. |
| 2007/0186691 A1 | 8/2007 | Morishita |
| 2008/0002444 A1 | 1/2008 | Shekhawat et al. |
| 2008/0031021 A1 | 2/2008 | Ros et al. |
| 2008/0143289 A1 | 6/2008 | Marcinkiewicz et al. |
| 2008/0185986 A1 | 8/2008 | Marcinkiewicz et al. |
| 2008/0246445 A1 | 10/2008 | Wrathall |
| 2008/0272747 A1 | 11/2008 | Melanson |
| 2008/0278101 A1 | 11/2008 | Shahi et al. |
| 2008/0284401 A1 | 11/2008 | Oettinger et al. |
| 2008/0304189 A1 | 12/2008 | Tang et al. |
| 2008/0310200 A1 | 12/2008 | Maksimovic et al. |
| 2009/0021208 A1 | 1/2009 | Romenesko et al. |
| 2009/0122582 A1 | 5/2009 | Ye et al. |
| 2009/0153113 A1 | 6/2009 | Zilberberg |
| 2009/0160254 A1 | 6/2009 | Wu et al. |
| 2009/0168476 A1 | 7/2009 | Moon et al. |
| 2009/0174262 A1 | 7/2009 | Martin et al. |
| 2009/0243561 A1 | 10/2009 | Tan et al. |
| 2009/0303764 A1 | 12/2009 | Jin et al. |
| 2010/0066283 A1 | 3/2010 | Kitanaka |
| 2010/0080026 A1 | 4/2010 | Zhang |
| 2010/0246228 A1 | 9/2010 | Kazlauskas |
| 2010/0292943 A1 | 11/2010 | Minor et al. |
| 2010/0301787 A1 | 12/2010 | Gallegos-Lopez et al. |
| 2010/0301788 A1 | 12/2010 | Chen et al. |
| 2011/0012579 A1 | 1/2011 | Huang |
| 2011/0031920 A1 | 2/2011 | Henderson et al. |
| 2011/0031943 A1 | 2/2011 | Green |
| 2011/0057637 A1 | 3/2011 | Liu |
| 2011/0075462 A1 | 3/2011 | Wildash |
| 2011/0127938 A1 | 6/2011 | Kawakami et al. |
| 2011/0156619 A1 | 6/2011 | Nomura |
| 2011/0175560 A1 | 7/2011 | Akiyama |
| 2012/0206077 A1 | 8/2012 | Yoneshima et al. |
| 2013/0063100 A1 | 3/2013 | Henzler |
| 2014/0152212 A1 | 6/2014 | Zhang et al. |

FOREIGN PATENT DOCUMENTS

| | | |
|---|---|---|
| CN | 1748357 A | 3/2006 |
| CN | 1864319 A | 11/2006 |
| CN | 1890870 A | 1/2007 |
| CN | 1929290 A | 3/2007 |
| CN | 1976211 A | 6/2007 |
| CN | 1987258 A | 6/2007 |
| CN | 101047342 A | 10/2007 |
| CN | 101345886 A | 1/2009 |
| CN | 101399516 A | 4/2009 |
| CN | 101408568 A | 4/2009 |
| CN | 201242570 Y | 5/2009 |
| CN | 101485073 A | 7/2009 |
| CN | 101958657 A | 1/2011 |
| EP | 645589 | 3/1995 |
| EP | 2276157 A1 | 1/2011 |
| EP | 2381568 A2 | 10/2011 |
| JP | 08249067 A | 9/1996 |
| JP | 09062363 A | 3/1997 |
| JP | 09308283 A | 11/1997 |
| JP | 2000044135 A | 2/2000 |
| JP | 2000199780 A | 7/2000 |
| JP | 2001314095 A | 11/2001 |
| JP | 2002199780 A | 7/2002 |
| JP | 2003018704 A | 1/2003 |
| JP | 2004112942 A | 4/2004 |
| JP | 2005207942 A | 8/2005 |
| JP | 2006034070 A | 2/2006 |
| JP | 2007259686 A | 10/2007 |
| JP | 2008125313 A | 5/2008 |
| KR | 19980080006 A | 6/2002 |
| KR | 20060009199 A | 1/2006 |
| KR | 20060129272 A | 12/2006 |
| KR | 20070064726 A | 6/2007 |
| KR | 20080060290 A | 7/2008 |
| KR | 20110001923 A | 1/2011 |

(56) References Cited

FOREIGN PATENT DOCUMENTS

| WO | 2009048563 A2 | 4/2009 |
|---|---|---|
| WO | WO-2009058024 A1 | 5/2009 |
| WO | WO-2013016505 A2 | 1/2013 |

OTHER PUBLICATIONS

Written Opinion of the International Searching Authority regarding Application No. PCT/US2013/054359, mailed Nov. 22, 2013.
Examination Communication from the European Patent Office regarding European Patent Application No. 10808617.4, dated Nov. 4, 2013.
First Office Action from the State Intellectual Property Office from People's Republic of China regarding Chinese Patent Application No. 201080045534.6, dated Feb. 8, 2014. Translation provided by Unitalen Attorneys at Law.
First Chinese Office Action regarding Application No. 201080044591.2, dated Jan. 24, 2014. Translation provided by Unitalen Attorneys at Law.
First Chinese Office Action regarding Application No. 201080044562.6, dated Feb. 11, 2014. Translation provided by Unitalen Attorneys at Law.
First Chinese Office Action regarding Application No. 201080044563.0, dated Feb. 8, 2014. Translation provided by Unitalen Attorneys at Law.
Interview Summary regarding U.S. Appl. No. 12/852,619, dated Apr. 17, 2013.
Interview Summary regarding U.S. Appl. No. 12/852,565, dated Jun. 18, 2013.
Interview Summary regarding U.S. Appl. No. 12/852,565, dated Jan. 16, 2013.
"2nd Generation of PFC Solutions," Michael Frisch, Temesi Erno, Yu Jinghui, Tyco Electronics/Power Systems, Sep. 2004.
"Advantages of Interleaved Boost Converters for PFC," Michael O'Loughlin, Texas Instruments, Mar. 30, 2006.
"Power-Factor Correction with Interieved Boost Converters in Continuous-Inductor-Current Mode," Laszlo Balogh and Richard Redl, IEEE 1993.
"Real-Time Computer Control: An Introduction," Bennett, S., Prentice Hall International (UK) Ltd., Chapter 2 (pp. 19-47) and Chapter 4 (pp. 99-128), 1988.
Baggio, J.E., et al., "Discrete control for three-level boost PFC converter," Telecommunications Energy Conference, 2002. INTELEC. 24th Annual International, pp. 627-633,2002. doi: 10.1109/INTLEC. 2002.1048772; URL: http://ieeexplore.ieee.org/stamp/stamp.jsp?tp=&arnumber=1048722&isnumber=22440.
Extended European Search Report regarding Application No. 10808617.4—1242 / 2465187, dated Jan. 30, 2013.
International Seach Report regarding Application No. PCT/US2010/044991, mailed Apr. 22, 2011.
International Search Report regarding Application No. PCT/US2010/044982, mailed Feb. 23, 2011.
International Search Report regarding Application No. PCT/US2010/044993, mailed Apr. 25, 2011.
International Search Report regarding Application No. PCT/US2010/044998, Apr. 21, 2011.
International Search Report regarding Application No. PCT/US2010/045005, mailed Apr. 25, 2011.
International Search Report regarding Application No. PCT/US2010/045025, mailed Apr. 18, 2011.
International Search Report regarding Application No. PCT/US2010/045032, mailed Apr. 25, 2011.
International Search Report regarding Application No. PCT/US2010/045041, mailed Feb. 22, 2011.
International Search Report regarding Application No. PCT/US2010/045046, mailed Apr. 6, 2011.
Korean Decision for Patent Grant regarding Application No. 10-2012-7006166, dated Jun. 26, 2013. Translation provided by Y.S. Chang & Associates.
Laszlo Huber et al. "Performance Evaluation of Bridgeless PFC Boost Rectifiers." Delta Products Corporation. Power Electronics Laboratory. Applied Power Electronics Conference. APEC 2007—Twenty Second Annual IEEE, IEEE, PI. Feb. 1, 2007. pp. 165-171.
Non-Final Office Action regarding U.S. Appl. No. 12/852,557, dated Jan. 3, 2013.
Non-Final Office Action regarding U.S. Appl. No. 12/852,619, dated Mar. 27, 2013.
Notice of Allowance and Fee(s) Due and Notice of Allowability regarding U.S. Appl. No. 12/852,549, dated Apr. 2, 2012.
Notice of Allowance and Fee(s) Due regarding U.S. Appl. No. 12/852,553, dated Sep. 21, 2012.
Notice of Allowance and Fee(s) Due regarding U.S. Appl. No. 12/852,565, dated Mar. 4, 2013.
Notice of Allowance and Fee(s) Due regarding U.S. Appl. No. 12/852,578, dated Nov. 23, 2012.
Notice of Allowance and Fee(s) Due regarding U.S. Appl. No. 12/852,961, dated Mar. 8, 2013.
Notice of Allowance and Fees Due regarding U.S. Appl. No. 12/852,625, dated Mar. 15, 2012.
Notice of Allowance regarding U.S. Appl. No. 12/852,585, dated Aug. 28, 2012.
Notice of Grounds for Rejection regarding Korean Patent Application No. 10-2012-7006210, dated Mar. 22, 2013. Translation provided by Y.S. Chang & Associates.
Notification of Grounds for Refusal regarding Korean Patent Application No. 10-2012-7006277, dated Jul. 23, 2013. Translation provided by Y.S. Chang & Associates.
Office Action regarding U.S. Appl. No. 12/852,565, dated Oct. 15, 2012.
Song Dan; Shanghia University; The air conditioning compressor drive sensorless permanent magnet synchronous motor vector control method; Mar. 2008; 26 pages.
Written Opinion of the International Searching Authority regarding Application No. PCT/US2010/044982, mailed Feb. 23, 2011.
Written Opinion of the International Searching Authority regarding Application No. PCT/US2010/044991, mailed Apr. 22, 2011.
Written Opinion of the International Searching Authority regarding Application No. PCT/US2010/044993, mailed Apr. 25, 2011.
Written Opinion of the International Searching Authority regarding Application No. PCT/US2010/044998, mailed Apr. 21, 2011.
Written Opinion of the International Searching Authority regarding Application No. PCT/US2010/045005, mailed Apr. 25, 2011.
Written Opinion of the International Searching Authority regarding Application No. PCT/US2010/045025, mailed Apr. 18, 2011.
Written Opinion of the International Searching Authority regarding Application No. PCT/US2010/045032, mailed Apr. 25, 2011.
Written Opinion of the International Searching Authority regarding Application No. PCT/US2010/045041, mailed Feb. 22, 2011.
Written Opinion of the International Searching Authority regarding Application No. PCT/US2010/045046, mailed Apr. 6, 2011.
First Office Action and Search Report from the State Intellectual Property Office of People's Republic of China regarding Chinese Patent Application No. 201080045539.9, dated Jan. 16, 2014. Translation provided by Unitalen Attorneys at Law.
First Office Action from the State Intellectual Property Office of People's Republic of China regarding Chinese Patent Application No. 201080044561.1, dated Apr. 1, 2014. Translation provided by Unitalen Attorneys at Law.
Decision for Patent Grant regarding Korean Application No. 10-2012-7006277 dated Jan. 22, 2014; Translated by Y.S. Change & Associates.
Examination Communication regarding EP10808617.4, dated Dec. 9, 2014.
Examination Report No. 1 regarding Australian Application No. 2010282629 dated Jun. 3, 2013.
First Office Action from State Intellectual Property Office for People's Republic of China regarding Chinese Patent Application No. 201080044559.4, dated Apr. 17, 2014. Translation provided by Unitalen Attorneys at Law.

(56) References Cited

OTHER PUBLICATIONS

First Office Action from the State Intellectual Property Office of People's Republic of China regarding Application No. 201080044566.4, dated Jun. 17, 2014. Translation provided by Unitalen Attorneys at Law.

Notice of Acceptance regarding Australian Application No. 2010282629, dated Mar. 3, 2014.

Notification for Patent Registration Formality and Grant of Patent Right for Invention regarding Chinese Application No. 201080045539.9 dated Nov. 6, 2014; Translated by Unitalen Attorneys At Law.

Notification of Grounds for Refusal regarding Korean Application No. 10-2012-7006277 dated Sep. 23, 2013; Translated by Y.S. Change & Associates.

Office Action regarding U.S. Appl. No. 13/963,317, mailed Mar. 16, 2015.

Second Office Action from the State Intellectual Property Office from People's Republic of China regarding Chinese Application No. 201080044559.4, dated Oct. 10, 2014. Translation provided by Unitalen Attorneys at Law.

Second Office Action from the State Intellectual Property Office of People's Republic of China regarding Chinese Patent Application No. 201080045539.9, dated Jul. 17, 2014. Translation provided by Unitalen Attorneys at Law.

\* cited by examiner

POWER FACTOR CORRECTION WITH VARIABLE BUS VOLTAGE

CROSS-REFERENCE TO RELATED APPLICATIONS

This application claims is a continuation of U.S. application Ser. No. 12/852,557, filed on Aug. 9, 2010, which claims the benefit of U.S. Provisional App. No. 61/232,754, filed on Aug. 10, 2009. The entire disclosures of the above applications are incorporated herein by reference.

FIELD

The present disclosure relates to electric motor control systems and methods and more particularly to power factor correction systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Power factor is an indicator of the relationship between current and voltage in a circuit, or how effectively a circuit uses real power compared to storing and returning energy to the power source. Power factor may be expressed as a value between zero and one. The circuit's use of actual real power divided by the total volt amps drawn by the circuit may increase as the power factor approaches one. In various implementations, a power factor correction (PFC) system may be implemented. PFC systems generally operate to increase a circuit's power factor toward one, thereby increasing the circuit's use of real power as compared with the amount of reactive power the circuit stores and returns to the source.

SUMMARY

A system includes a power factor correction (PFC) module, an inverter power module, and a controller. The PFC module converts incoming AC power into DC power. The inverter power module converts the DC power into three-phase AC power and drives a motor of a compressor using the three-phase AC power. The controller includes a voltage determination module, a voltage command module, a rate limiting module, and a PFC control module. The voltage determination module determines a desired voltage for the DC power based on at least one of a plurality of system parameters.

The voltage command module generates a commanded voltage based on the desired voltage. The voltage command module sets the commanded voltage equal to a startup voltage for a predetermined startup period after the controller is powered on. After the predetermined startup period, the voltage command module performs three functions. First, the voltage command module increases the commanded voltage to the desired voltage when the desired voltage is greater than the commanded voltage.

Second, the voltage command module increases the commanded voltage to a first threshold voltage when the first threshold voltage is greater than the commanded voltage. The first threshold voltage is based on a sum of a predetermined positive offset voltage and a measured peak voltage of the incoming AC power. Third, the voltage command module selectively decreases the commanded voltage to a greater one of a second threshold voltage and the desired voltage after a predetermined period has elapsed in which the commanded voltage has not been increased. The second threshold voltage is based on a sum of the offset voltage and a highest value of the measured peak voltage of the incoming AC power observed throughout the predetermined period.

The rate limiting module generates a limited commanded voltage by limiting a rate of change of the commanded voltage. When the controller is powered on, the rate limiting module initializes the limited commanded voltage to a measured voltage of the DC power. The PFC control module controls the PFC module to produce the DC power at the limited commanded voltage. In other features, the system further includes the compressor. The plurality of system parameters includes torque of the motor, speed of the motor, output power of the inverter power module, and drive input power.

A controller includes a voltage determination module, a bus voltage command module, and a power factor correction (PFC) control module. The voltage determination module determines a desired direct current (DC) bus voltage for a DC bus electrically connected between a PFC module and an inverter power module that drives a compressor motor. The voltage determination module determines the desired DC bus voltage based on at least one of torque of the compressor motor, speed of the compressor motor, output power of the inverter power module, and drive input power. The bus voltage command module determines a commanded bus voltage based on the desired DC bus voltage. The PFC control module controls the PFC module to create a voltage on the DC bus that is based on the commanded bus voltage.

In other features, the bus voltage command module sets the commanded bus voltage equal to a measured voltage of the DC bus when the controller transitions from an off state to an on state.

In further features, the controller further includes a rate limiting module that generates a rate limited voltage. The PFC control module controls the PFC module to create the rate limited voltage on the DC bus. The rate limited voltage is equal to the measured voltage of the DC bus when the controller transitions from the off state to the on state. After the controller transitions from the off state to the on state, the bus voltage command module sets the commanded bus voltage equal to a predetermined startup voltage for a predetermined startup period, and the rate limiting module ramps the rate limited voltage toward the commanded bus voltage during the predetermined startup period.

In still other features, the bus voltage command module increases the commanded bus voltage to a greater one of the desired DC bus voltage and a first sum when the commanded bus voltage is less than either the desired DC bus voltage or the first sum. The first sum is equal to a predetermined offset plus a peak voltage of an AC line powering the PFC module.

In other features, the bus voltage command module decreases the commanded bus voltage to a greater one of the desired DC bus voltage and a second sum after a predetermined period in which the commanded bus voltage was not increased. The second sum is equal to the predetermined offset plus a highest value of the peak voltage observed during the predetermined period.

In further features, a system includes the controller, the PFC module, the inverter power module, and a condenser inverter module that drives a condenser fan using power from the DC bus. A system includes the controller, the PFC module, the inverter power module, a condenser inverter module that drives a condenser fan using power from a second DC bus, and an electrical linkage between the DC bus and the second DC bus that provides excess power from the DC bus to the second DC bus.

A method includes converting incoming AC power into DC power using a power factor correction (PFC) module; converting the DC power into AC power using an inverter power module; driving a motor of a compressor using the AC power; determining a desired voltage for the DC power based on at least one of torque of the motor, speed of the motor, output power of the inverter power module, and drive input power; generating a commanded voltage based on the desired voltage; and controlling the PFC module to produce the DC power at a voltage based on the commanded voltage.

In other features, the method further includes setting the commanded voltage equal to a startup voltage for a predetermined startup period upon power-on.

In further features, the method further includes generating a limited commanded voltage by limiting a rate of change of the commanded voltage; controlling the PFC module to produce the DC power at the limited commanded voltage; and at a beginning of the predetermined startup period, initializing the limited commanded voltage to a measured voltage of the DC power.

In still other features, the method further includes maintaining the commanded voltage to be greater than or equal to the desired voltage. The method further includes determining a threshold voltage based on a sum of a predetermined positive offset voltage and a measured peak voltage of the incoming AC power; and maintaining the commanded voltage to be greater than or equal to the threshold voltage.

In other features, the method further includes increasing the commanded voltage to the desired voltage when the desired voltage is greater than the commanded voltage; and increasing the commanded voltage to a first threshold voltage when the first threshold voltage is greater than the commanded voltage. The first threshold voltage is based on a sum of a predetermined positive offset voltage and a measured peak voltage of the incoming AC power.

In further features, the method further includes selectively decreasing the commanded voltage to a greater one of a second threshold voltage and the desired voltage after a predetermined period has elapsed in which the commanded voltage has not been increased. The second threshold voltage is based on a sum of the offset voltage and a highest value of the measured peak voltage of the incoming AC power observed throughout the predetermined period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
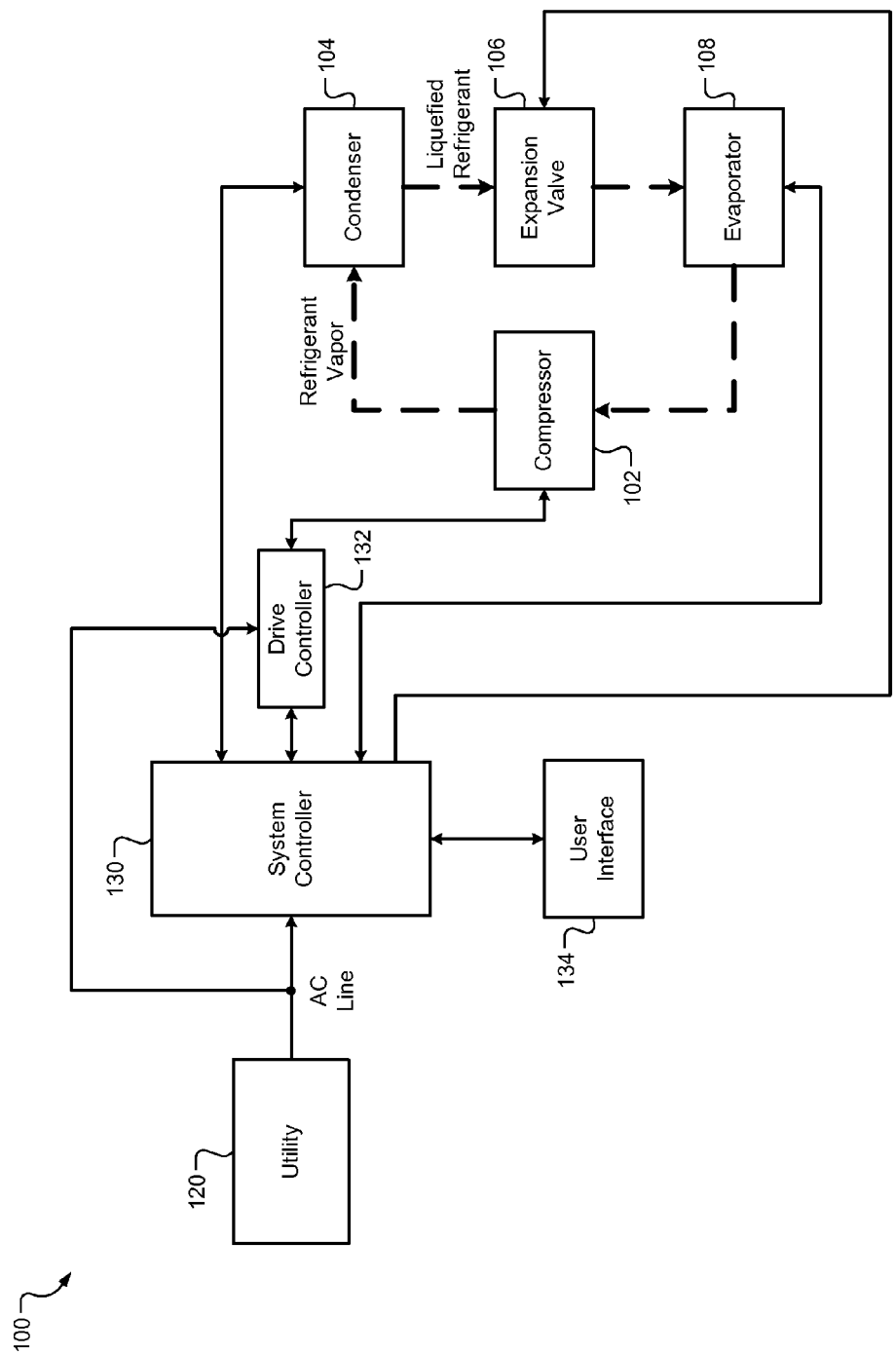
FIG. 1 is a functional block diagram of an example refrigeration system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of a refrigeration system 100 is presented. The refrigeration system 100 may include a compressor 102, a condenser 104, an expansion valve 106, and an evaporator 108. According to the principles of the present disclosure, the refrigeration system 100 may include additional and/or alternative components. In addition, the present disclosure is applicable to other suitable types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
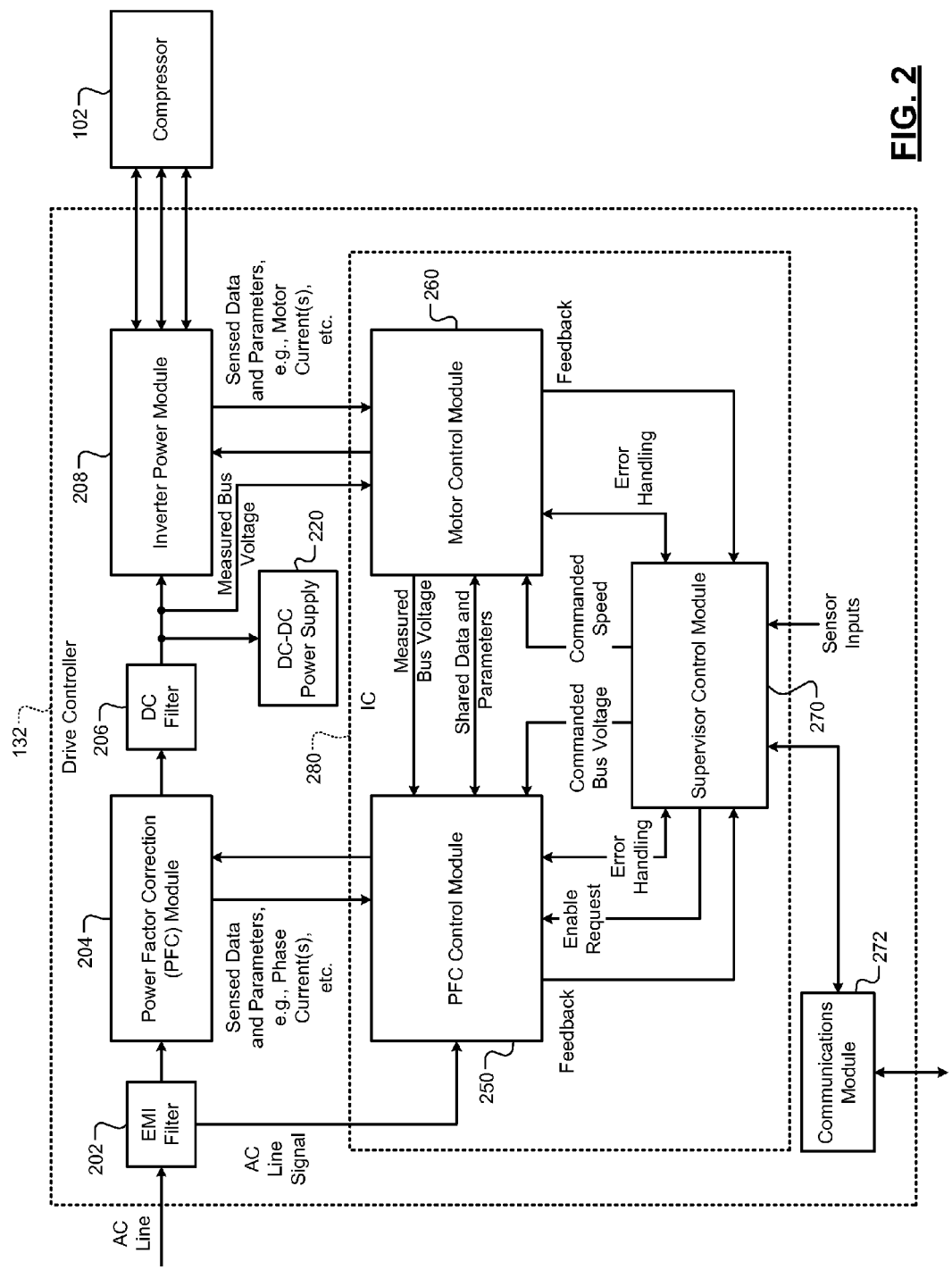
FIG. 2 is a functional block diagram of an example drive controller and an example compressor.

Referring now to FIG. 2, a functional block diagram of the drive controller 132 and the compressor 102 is presented. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 (described in more detail with reference to FIGS. 3a, 3b, and 3c) rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 V has a peak voltage of approximately 325 V (230 V multiplied by the square root of 2). For example only, when operating from AC power having an RMS voltage of 230 V, the PFC module 204 may generate boosted DC voltages between approximately 350 V and approximately 410 V. For example only, the lower limit of 350 V may be imposed to avoid unstable operating regimes of the PFC module 204. The limits may vary, such as with the actual AC input voltage value. In various implementations, the PFC module 204 may be able to achieve higher boosted DC voltages than 410 V. However, the upper limit may be imposed to improve long-term reliability of components that would experience greater stress at higher voltages, such as components in a DC filter 206. In various implementations, the upper and/or lower limits may be varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 4a, 4b, and 4c) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)—for example, a DC voltage derived via a transformer from the main 230 VAC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. In various implementations, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208 and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt switching of the switches of the PFC module 204, while the motor control module 260 may halt switching of the switches of the inverter power module 208. In addition, the motor control module 260 may directly provide fault information to the PFC control module 250. In this way, the PFC control module 250 can respond to a fault identified by the motor control module 260 even if the supervisor control module 270 is not operating correctly and vice versa.

The PFC control module 250 may control switches in the PFC module 204 using pulse width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between the measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 may control switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, duty cycle of the inverter PWM signals, and other suitable parameters. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, commanded bus voltage, and other suitable parameters.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
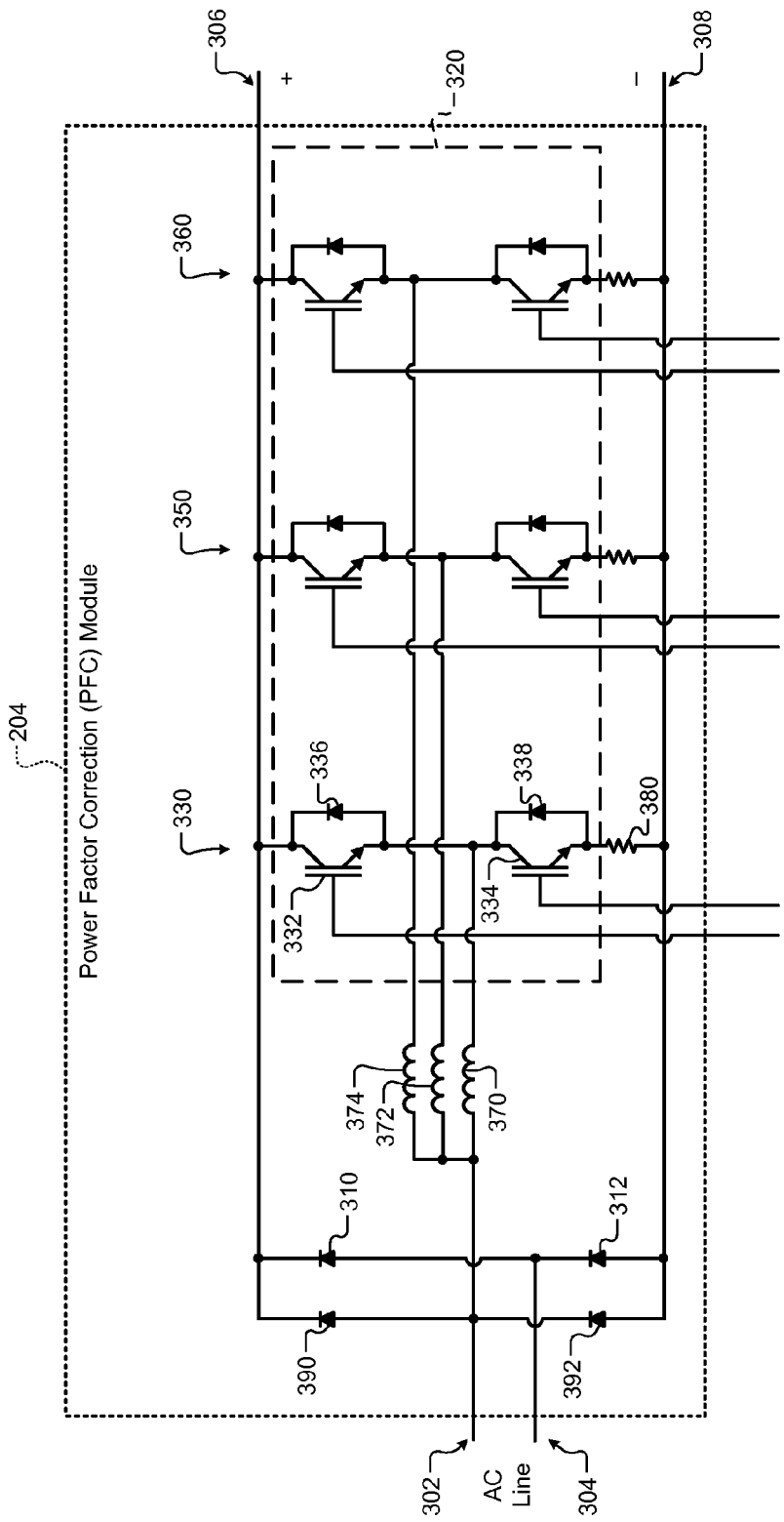
FIGS. 3a-3c are simplified schematics of example power factor correction (PFC) modules.

FIG. 3a is a schematic of an example implementation of the PFC module 204. The PFC module 204 receives AC power via first and second AC input terminals 302 and 304. The AC power may be, for example, the AC power output by the EMI filter 202. In various implementations, the signals at the first and second AC input terminals 302 and 304 may both be time-varying with respect to an earth ground. The PFC module 204 outputs DC power to the DC filter 206 and the inverter power module 208 via a positive DC terminal 306 and a negative DC terminal 308.

An anode of a first rectifier diode 310 is connected to the second AC input terminal 304, and a cathode of the first rectifier diode 310 is connected to the positive DC terminal 306. An anode of a second rectifier diode 312 is connected to the negative DC terminal 308, and a cathode of the second rectifier diode 312 is connected to the second AC input terminal 304. Each of the rectifier diodes 310 and 312 may be implemented as one or more individual series or parallel diodes.

A switch block 320 is connected between the positive and negative DC terminals 306 and 308. The switch block 320 includes a first PFC leg 330 that includes first and second switches 332 and 334. The switches 332 and 334 each include a first terminal, a second terminal, and a control terminal. In various implementations, each of the switches 332 and 334 may be implemented as an insulated gate bipolar transistor (IGBT). In such implementations, the first, second, and control terminals may correspond to collector, emitter, and gate terminals, respectively.

The first terminal of the first switch 332 is connected to the positive DC terminal 306. The second terminal of the first switch 332 is connected to the first terminal of the second switch 334. The second terminal of the second switch 334 may be connected to the negative DC terminal 308. In various implementations, the second terminal of the second switch 334 may be connected to the negative DC terminal 308 via a shunt resistor 380 to enable measuring current flowing through the first PFC leg 330.

The control terminals of the switches 332 and 334 receive generally complementary PFC PWM signals from the PFC control module 250. In other words, the PFC PWM signal provided to the first switch 332 is opposite in polarity to the PFC PWM signal provided to the second switch 334. Short circuit current may flow when the turning on of one of the switches 332 and 334 overlaps with the turning off of the other of the switches 332 and 334. Therefore, both the switches 332 and 334 may be turned off during a deadtime before either one of the switches 332 and 334 is turned on. Therefore, generally complementary means that two signals are opposite for most of their periods. However, around transitions, both signals may be low or high for some overlap period.

The first PFC leg 330 may also include first and second diodes 336 and 338 connected anti-parallel to the switches 332 and 334, respectively. In other words, an anode of the first diode 336 is connected to the second terminal of the first switch 332, and a cathode of the first diode 336 is connected to the first terminal of the first switch 332. An anode of the second diode 338 is connected to the second terminal of the second switch 334, and a cathode of the second diode 338 is connected to the first terminal of the second switch 334.

The switch block 320 may include one or more additional PFC legs. In various implementations, the switch block 320 may include one additional PFC leg. As shown in FIG. 3a, the switch block 320 includes second and third PFC legs 350 and 360. The number of PFC legs included in the switch block 320 may be chosen based on performance and cost. For example only, the magnitude of ripple (voltage and current) in the DC output of the PFC module 204 may decrease as the number of PFC legs increases. In addition, the amount of ripple current in the AC line current may decrease as the number of PFC legs increase. However, parts costs and implementation complexity may increase as the number of PFC legs increases.

The second and third PFC legs 350 and 360 of the switch block 320 may be similar to the first PFC leg 330. For example only, the second and third PFC legs 350 and 360 may each include respective components for the switches 332 and 334, the diodes 336 and 338, and respective shunt resisters connected in the same manner as the first PFC leg 330.

The PFC PWM signals provided to the switches of the additional PFC legs may also be complementary in nature. The PFC PWM signals provided to the additional PFC legs may be phase shifted from each other and from the PFC PWM signals provided to the first PFC leg 330. For example only, the phase shift of the PFC PWM signals may be determined by dividing 360 degrees (°) by the number of PFC legs. For example, when the switch block 320 includes three PFC legs, the PFC PWM signals may be phase shifted from each other by 120° (or 180° for two phases, or 90° for four phases, etc.). Phase shifting the PFC PWM signals may cancel ripple in the AC line current as well as the DC output.

The PFC module 204 includes a first inductor 370. The first inductor 370 is connected between the first AC input terminal 302 and the second terminal of the first switch 332. Additional inductors may connect the first AC input terminal 302 to additional PFC legs. For example only, FIG. 3a shows a second inductor 372 and a third inductor 374 connecting the first AC input terminal 302 to the second and third PFC legs 350 and 360, respectively.

A voltage may be measured across the shunt resistor 380 to determine current through the first PFC leg 330 according to Ohm's law. An amplifier (not shown), such as an operational amplifier, may amplify the voltage across the shunt resistor 380. The amplified voltage may be digitized, buffered, and/or filtered to determine the current through the first PFC leg 330. Current through other PFC legs may be determined using respective shunt resistors.

Figure 3B:
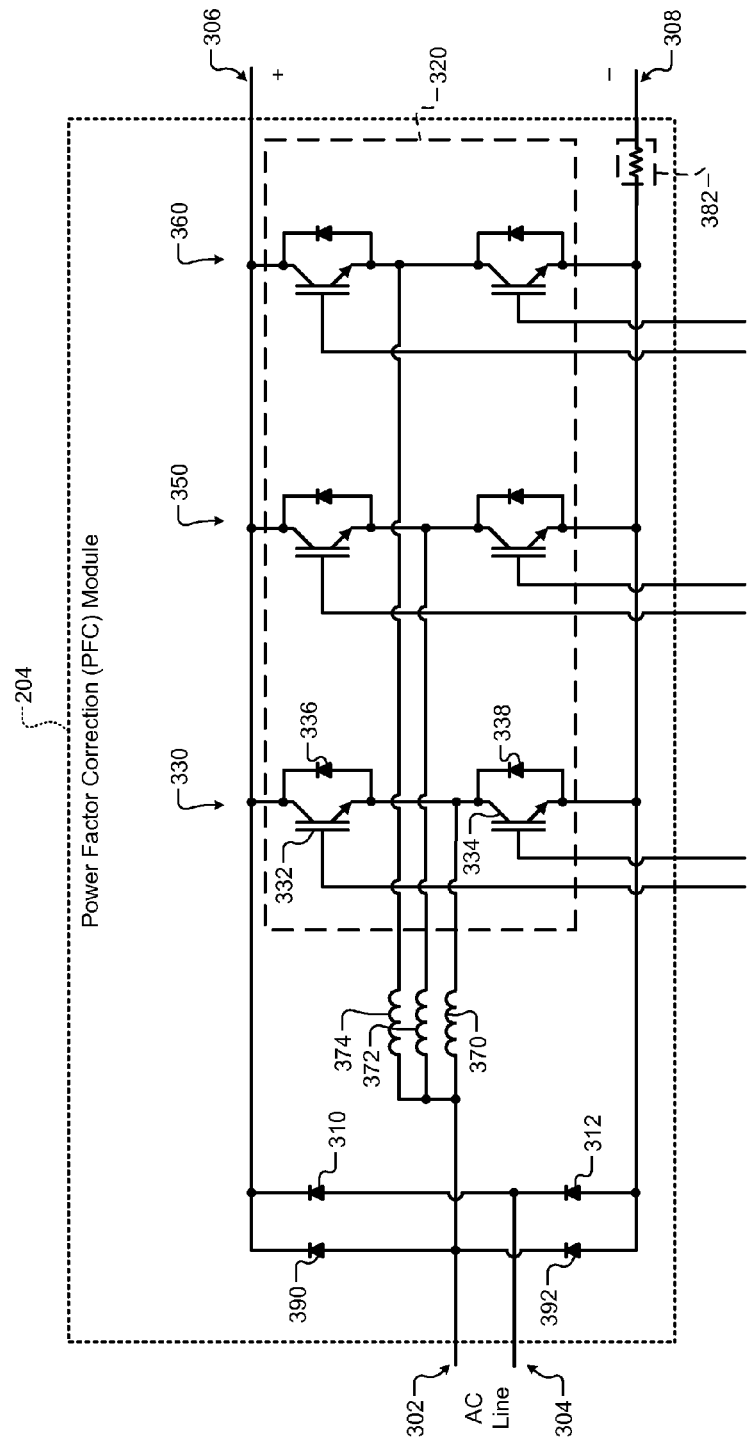

Additionally or alternatively, a resistor 382 may be connected in series with the negative DC terminal 308, as shown in FIG. 3b. Current through the resistor 382 may therefore indicate a total current output from the PFC module 204. Current through each of the PFC legs 330, 350, and 360 may be inferred from the total current based on the known phase timing of the current through the PFC legs 330, 350, and 360.

Figure 3C:
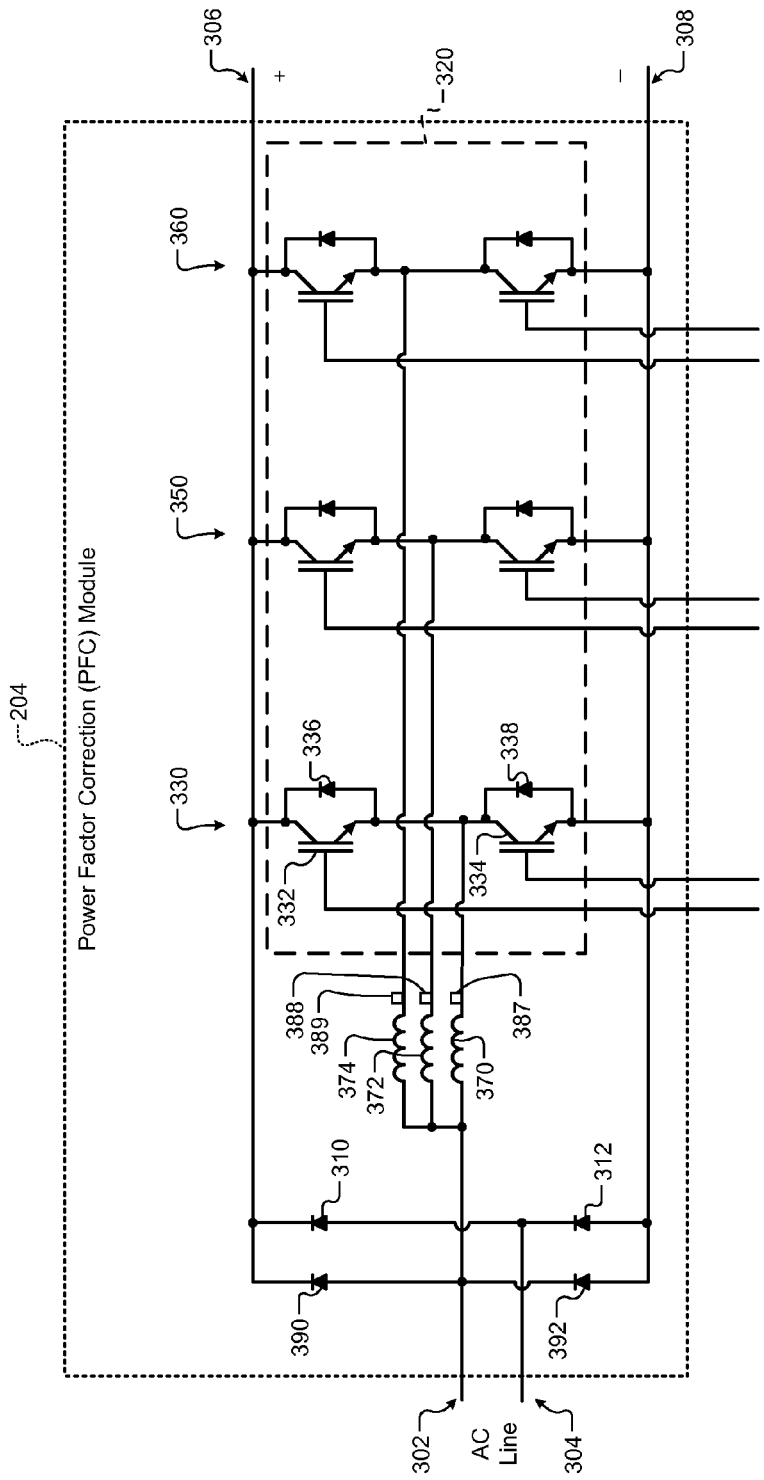

Any method of measuring or sensing current through any or all of the PFC legs 330, 350, 360 may be used. For example, in various implementations, the current through the first PFC leg 330 may be measured using a current sensor 387 (as shown in FIG. 3c). For example only, the current sensor 387 may be implemented in series with the first inductor 370. In various implementations, the current sensor 387 may include a Hall-effect sensor that measures the current through the first PFC leg 330 based on magnetic flux around the first inductor 370. Current through the PFC legs 350 and 360 may also be measured using associated current sensors 388 and 389, respectively.

The PFC module 204 may also include first and second bypass diodes 390 and 392. An anode of the first bypass diode 390 is connected to the first AC input terminal 302, and a cathode of the first bypass diode 390 is connected to the positive DC terminal 306. An anode of the second bypass diode 392 is connected to the negative DC terminal 308, and a cathode of the second bypass diode 392 is connected to the first AC input terminal 302.

The bypass diodes 390 and 392 may be power diodes, which may be designed to operate at low frequencies, such as, for example, frequencies less than approximately 100 Hz or approximately 200 Hz. Resistance of the bypass diodes 390 and 392 may be less than resistance of the inductors 370, 372, and 374. Therefore, when the switches 332 and 334 within the switch block 320 are not being switched, current may flow through the bypass diodes 390 and 392 instead of the diodes 336 and 338.

When the PFC module 204 is operating to create a boosted DC voltage, the boosted DC voltage will be greater than a peak voltage on the AC line. The bypass diodes 390 and 392 will therefore not be forward biased and will remain inactive. The bypass diodes 390 and 392 may provide lightning strike protection and power surge protection.

In various implementations, the bypass diodes 390 and 392 may be implemented with the rectifier diodes 310 and 312 in a single package. For example only, Vishay model number 26MT or 36MT or International Rectifier, model number 26MB or 36MB may be used as the bypass diodes 390 and 392 and the rectifier diodes 310 and 312. The rectifier diodes 310 and 312 carry current whether the PFC module 204 is generating a boosted DC voltage or not. Therefore, in various implementations, each of the rectifier diodes 310 and 312 may be implemented as two physical diodes connected in parallel. Current sensors may be used to measure PFC phase currents in series with the inductors 370, 372, and 374.

Figure 4A:
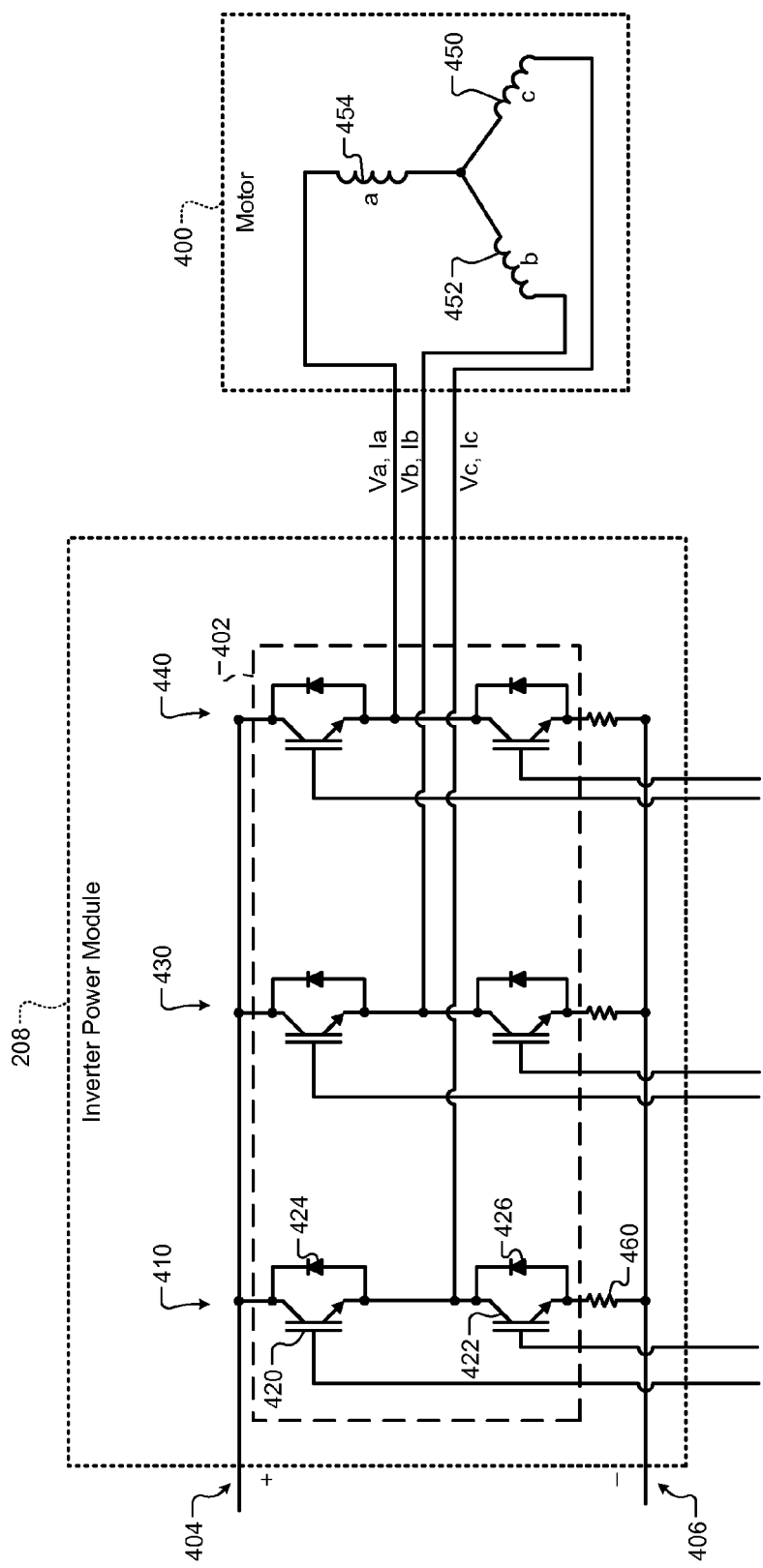
FIGS. 4a-4c are simplified schematics of example inverter power modules and example motors.

Referring now to FIG. 4*a*, a simplified schematic of a motor 400 and an example implementation of the inverter power module 208 is presented. The motor 400 is a component of the compressor 102 of FIG. 2. However, the principles of FIGS. 4*a*-4*c* may apply to other motors, including a motor of the condenser 104. The inverter power module 208 includes a switch block 402. In various implementations, the switch block 402 and the switch block 320 of the PFC module 204 may be implemented using a similar part. For example only, in FIG. 4*a*, a first inverter leg 410 includes first and second switches 420 and 422 and first and second diodes 424 and 426, which are arranged similarly to the switches 332 and 334 and the diodes 336 and 338 of FIG. 3*a*.

The switch block 402 receives the filtered DC voltage from the DC filter 206 via a positive DC terminal 404 and a negative DC terminal 406. The first terminal of the first switch 420 may be connected to the positive DC terminal 404, while the second terminal of the second switch 422 may be connected to the negative DC terminal 406. The control terminals of the switches 420 and 422 receive generally complementary inverter PWM signals from the motor control module 260.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 4*a*. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as Ia, Ib, and Ic, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410. In various implementations, the shunt resistor of one of the inverter legs 410, 430, or 440 may be omitted. In such implementations, current may be inferred based on the measurements of the remaining shunt resistors.

Figure 4B:
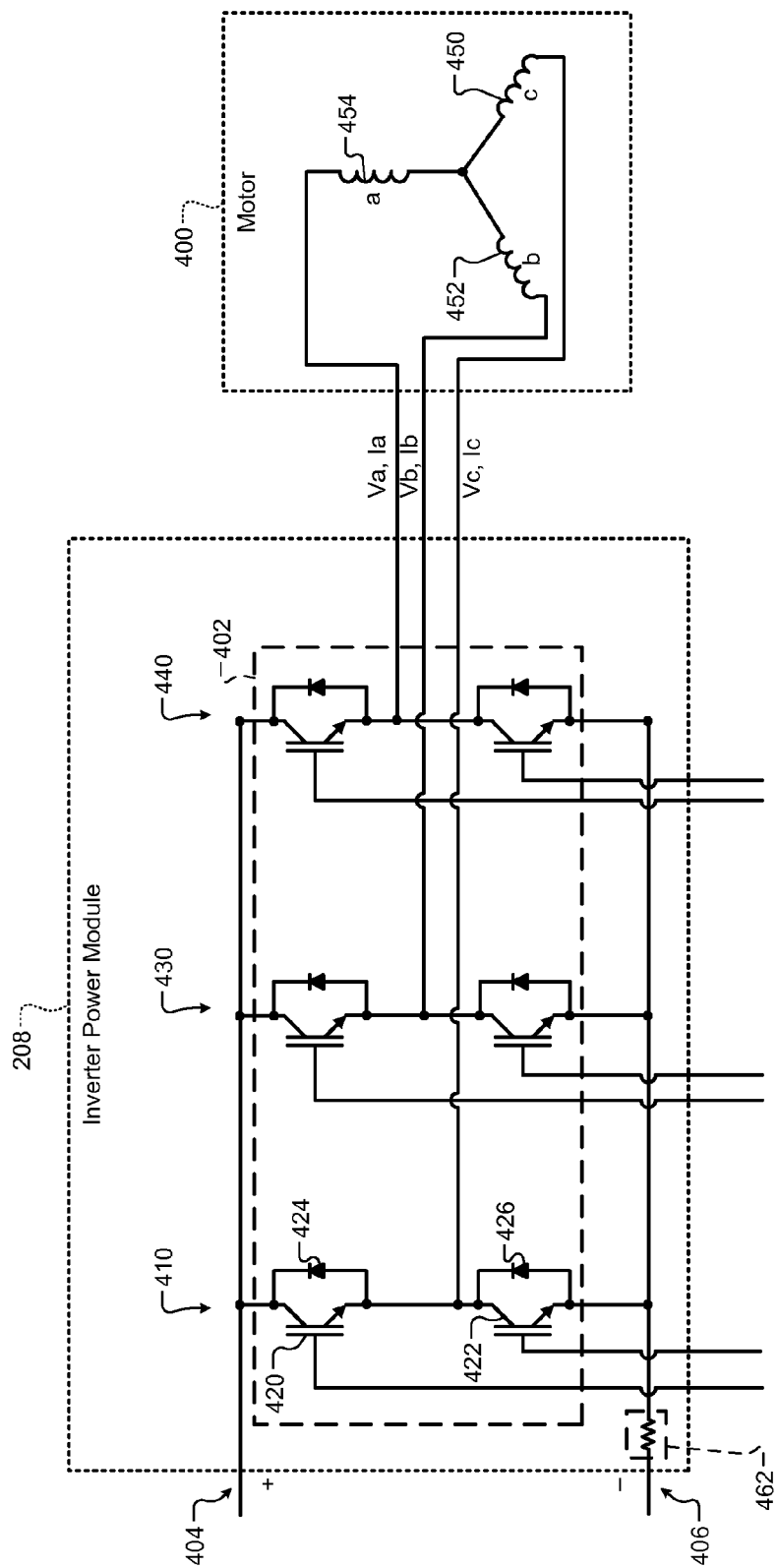
Figure 4C:
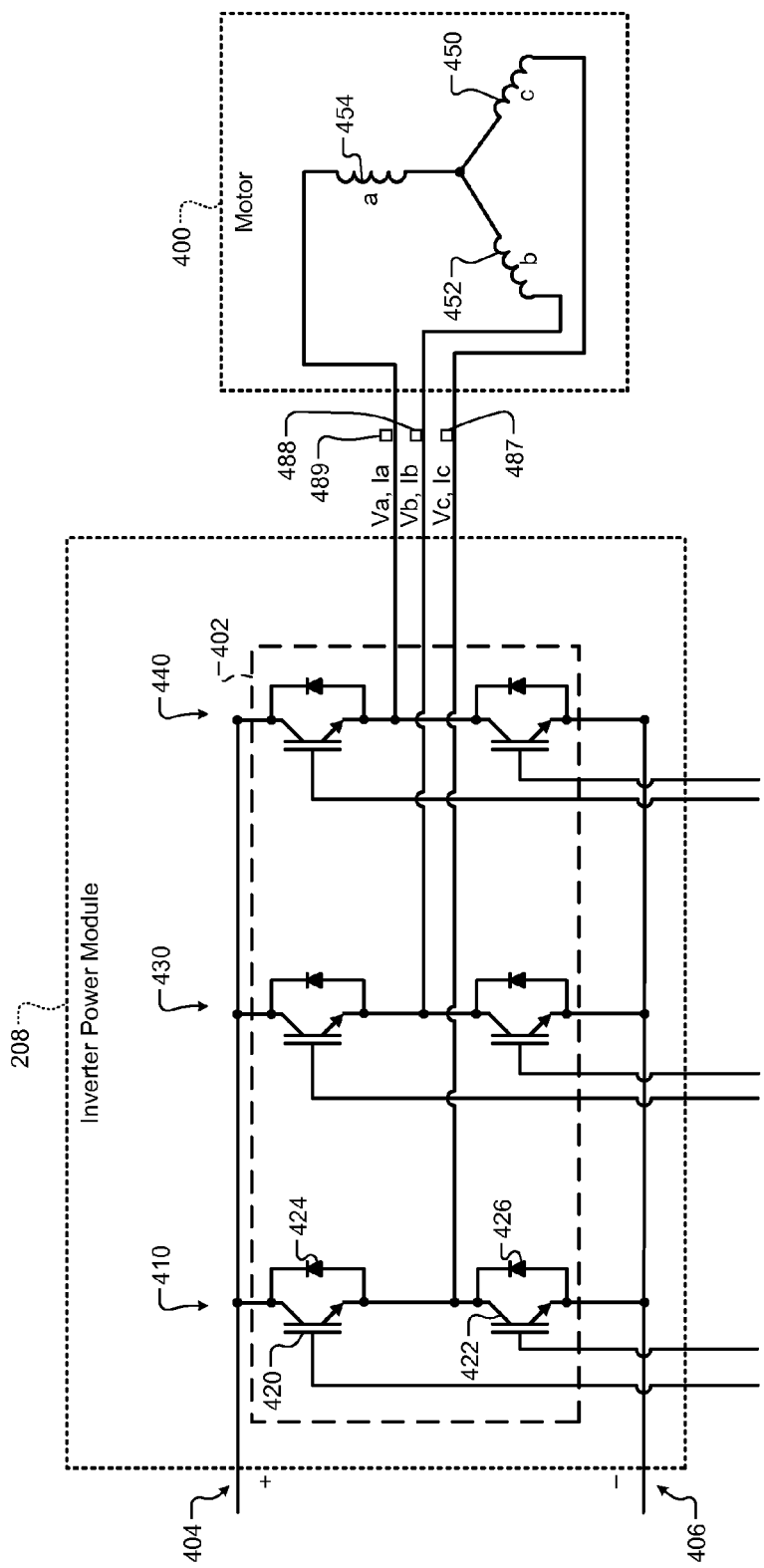

Additionally or alternatively, a resistor 462 may be connected in series with the negative DC terminal 406, as shown in FIG. 4*b*. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, which is incorporated by reference herein in its entirety.

Any method of measuring or sensing current through any or all of the inverter legs 410, 430, and 440 may be used. For example, in various implementations, the current through the first inverter leg 410 may be measured using a current sensor 487 (shown in FIG. 4*c*). For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 5:
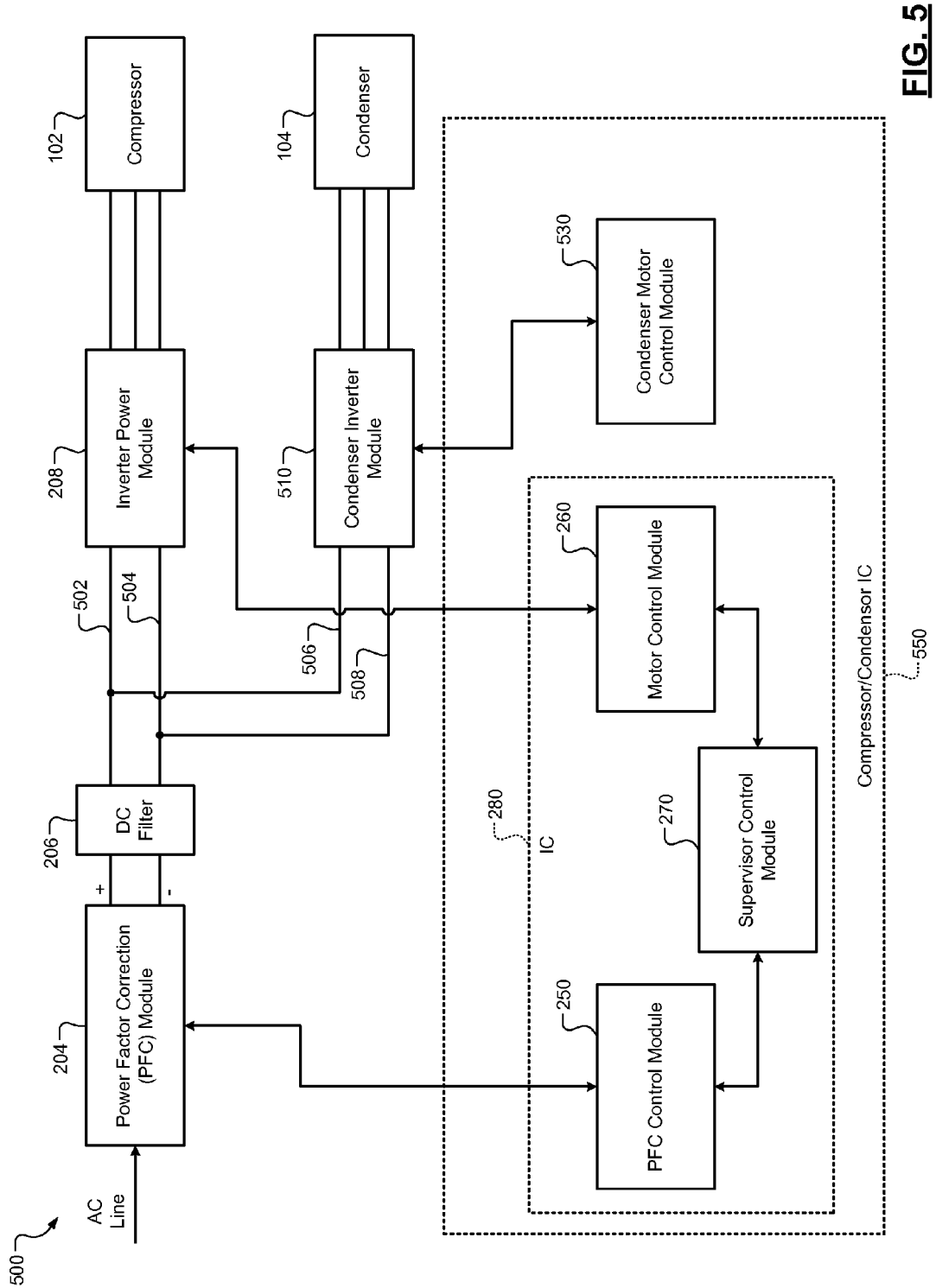
FIG. 5 is a functional block diagram of an example implementation of a common direct current (DC) bus refrigeration system.

Referring now to FIG. 5, a diagram of an example implementation of a common DC bus refrigeration system 500 is presented. In some implementations, the DC power from the PFC module 204 may also be provided to the condenser 104. In various implementations, the DC power may be filtered by the DC filter 206. Here, the DC bus from the DC filter 206 is explicitly shown as including a positive DC line 502 and a negative DC line 504. Second positive and negative DC lines 506 and 508 are connected between the DC lines 502 and 504, respectively, and a condenser inverter module 510.

The condenser inverter module 510 converts the DC power into AC power that is provided to the motor associated with the condenser 104 (e.g., the condenser fan motor). The condenser fan motor may be referred to as the condenser motor. In various implementations, the condenser inverter module 510 may convert the DC power into three-phase AC power and provide the three phases of the AC power to three respective windings of the condenser motor. The condenser inverter module 510 may convert the DC power into more or fewer phases of power. In various implementations, the condenser inverter module 510 may be similar or identical to the inverter power module 208.

A condenser motor control module 530 controls the condenser inverter module 510. More specifically, the condenser motor control module 530 controls the flow of power to the condenser motor. The condenser motor control module 530 may control switches in the condenser inverter module 510 using PWM in order to achieve a commanded condenser speed. The duty cycle of PWM signals applied to the condenser inverter module 510 controls current through the windings of the condenser motor. The currents control torque, and the condenser motor control module 530 may control the torque to achieve the commanded condenser speed. As the condenser inverter module 510 draws DC power from the DC bus, the PFC control module 250 may control the PFC PWM signals to account for the operation of the condenser inverter module 510 and the condenser motor.

The condenser motor control module 530 may be implemented independently of the IC 280 or may be implemented with components of the IC 280 in a common IC, such as within a compressor/condenser IC 550. In various implementations, the condenser motor control module 530 may receive the commanded condenser speed from the supervisor control module 270 or from the system controller 130. In various implementations, the commanded condenser speed may be provided by the user interface 134 of FIG. 1.

Figure 6:
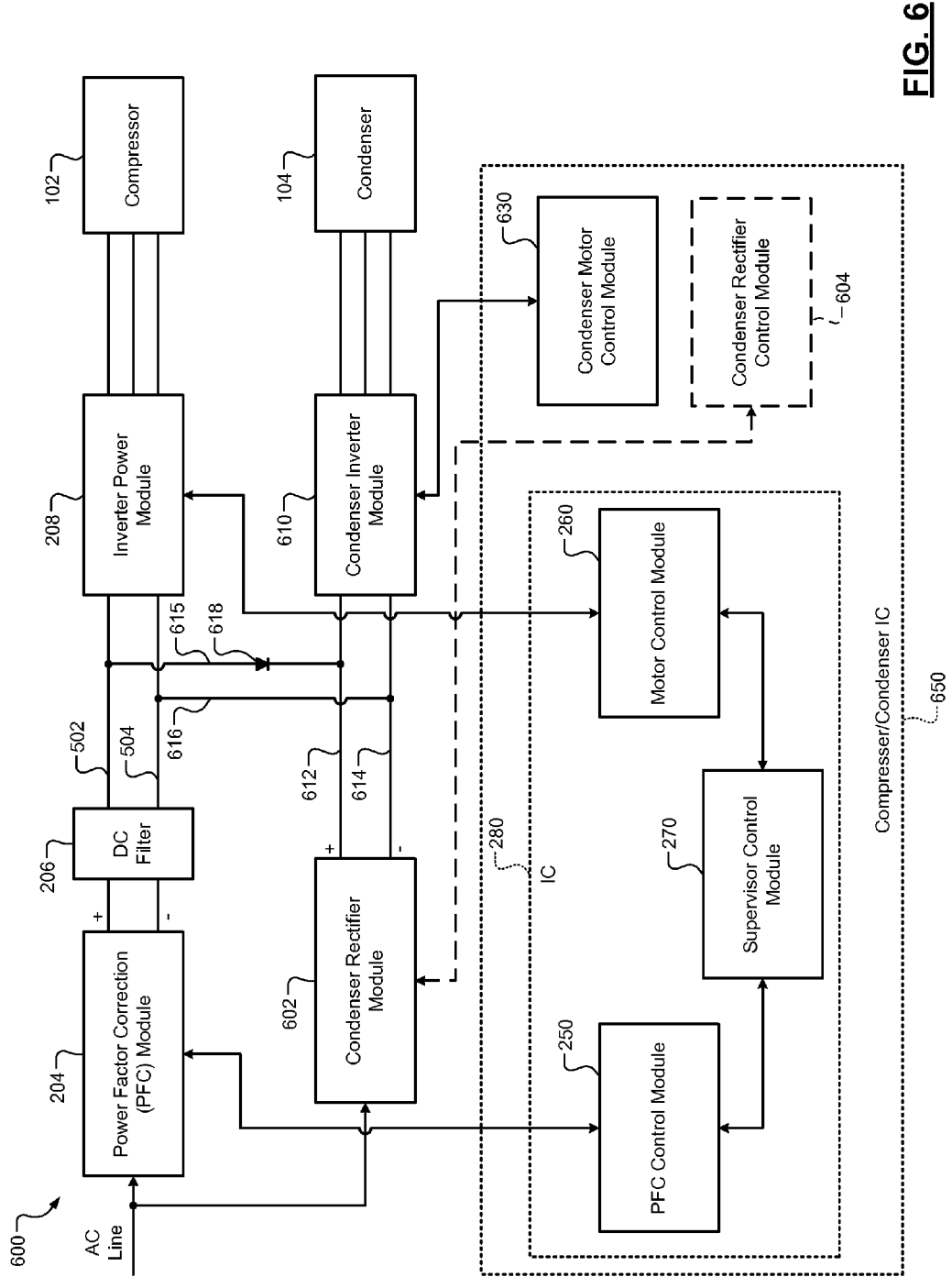
FIG. 6 is a functional block diagram of another example implementation of a common DC bus refrigeration system.

FIG. 6 is a diagram of an example common DC bus refrigeration system 600. Compared to the common DC bus refrigeration system 500 of FIG. 5, the refrigeration system 600 includes a condenser rectifier module 602. The condenser rectifier module 602 receives AC power, such as via the AC line output from the EMI filter 202. The condenser rectifier module 602 rectifies the AC power, thereby converting the AC power into a second DC power.

The condenser rectifier module 602 may include a full-bridge rectifier and may include circuitry to provide passive or active power factor correction. In various implementations, the condenser rectifier module 602 may be similar or identical to the PFC module 204. A condenser rectifier control module 604 may be provided to control the condenser rectifier module 602. The condenser rectifier module 602 provides the second DC power to a condenser inverter module 610 via positive and negative DC lines 612 and 614.

The condenser inverter module 610 converts the second DC power into AC power that is provided to the condenser motor. A first connecting line 615 connects the positive DC line 502 with the positive DC line 612. A second connecting line 616 connects the negative DC line 504 with the negative DC line 614.

A diode 618 may be included in series with the first connecting line 615 to block current from flowing from the positive DC line 612 to the positive DC line 502. An anode of the diode 618 may be connected to the positive DC line 502 and a cathode of the diode 618 may be connected to the positive DC line 612. Power that may otherwise be fed back to the PFC module 204 when the compressor motor slows or is back-driven may instead be distributed to the condenser motor and/or the condenser rectifier module 602.

In various implementations, the condenser inverter module 610 may convert the second DC power into three-phase AC power and provide the phases of the AC power to three respective windings of the condenser motor. Alternatively, the condenser inverter module 610 may convert the second DC power into more or fewer phases of power. In various implementations, the condenser inverter module 610 may be similar or identical to the inverter power module 208.

A condenser motor control module 630 controls the condenser inverter module 610 and may operate similarly to the condenser motor control module 530 of FIG. 5. The condenser motor control module 630 and the condenser rectifier control module 604 may be implemented independently of the IC 280 or may be implemented with components of the IC 280 in a common IC, such as within a compressor/condenser IC 650. In various implementations, the condenser motor control module 630 may receive the commanded condenser speed from the supervisor control module 270 or from the system controller 130. In various implementations, the commanded condenser speed may be provided by the user interface 134 of FIG. 1.

Typical PFC systems may receive a commanded fixed bus voltage. This fixed bus voltage, however, may be greater than is necessary to power the compressor 102, particularly in active PFC systems. The combination of the excessive fixed bus voltage and power losses inherent to PFC operation (as compared to passive/standard rectification) may result in significant power losses. Further, low values of the fixed bus voltage may cause the PFC system to switch on and off repeatedly, which may result in trips or faults. Under different operating conditions, the fixed bus voltage may be lower than is necessary to efficiently operate the PFC system. More specifically, the fixed bus voltage may be insufficient to operate the motor 400 at a desired speed under a high load.

Therefore, a system and method is presented that includes a variable bus voltage. More specifically, the system and method may determine a desired bus voltage ($V_{DES}$) based on one or more system parameters. For example only, $V_{DES}$ may be controlled within a range of 355 Volts (V) to 410 V.

The system and method determines a commanded bus voltage ($V_{BUS}$) based on $V_{DES}$, and $V_{BUS}$ is used to control operation of the PFC module 204. When the PFC module 204 is turned on, the bus voltage is measured and $V_{BUS}$ is ramped from the measured bus voltage to a predetermined startup voltage during a predetermined startup period. The predetermined startup voltage may be chosen to stabilize the PFC module 204, to prevent damage of components, and/or to prevent trips/faults. For example only, the predetermined startup voltage may be 410 V, and the predetermined startup period may be 15 seconds. After the predetermined startup period, $V_{BUS}$ is controlled based on $V_{DES}$ and $V_{PEAK}$, as described in more detail below.

Figure 7:
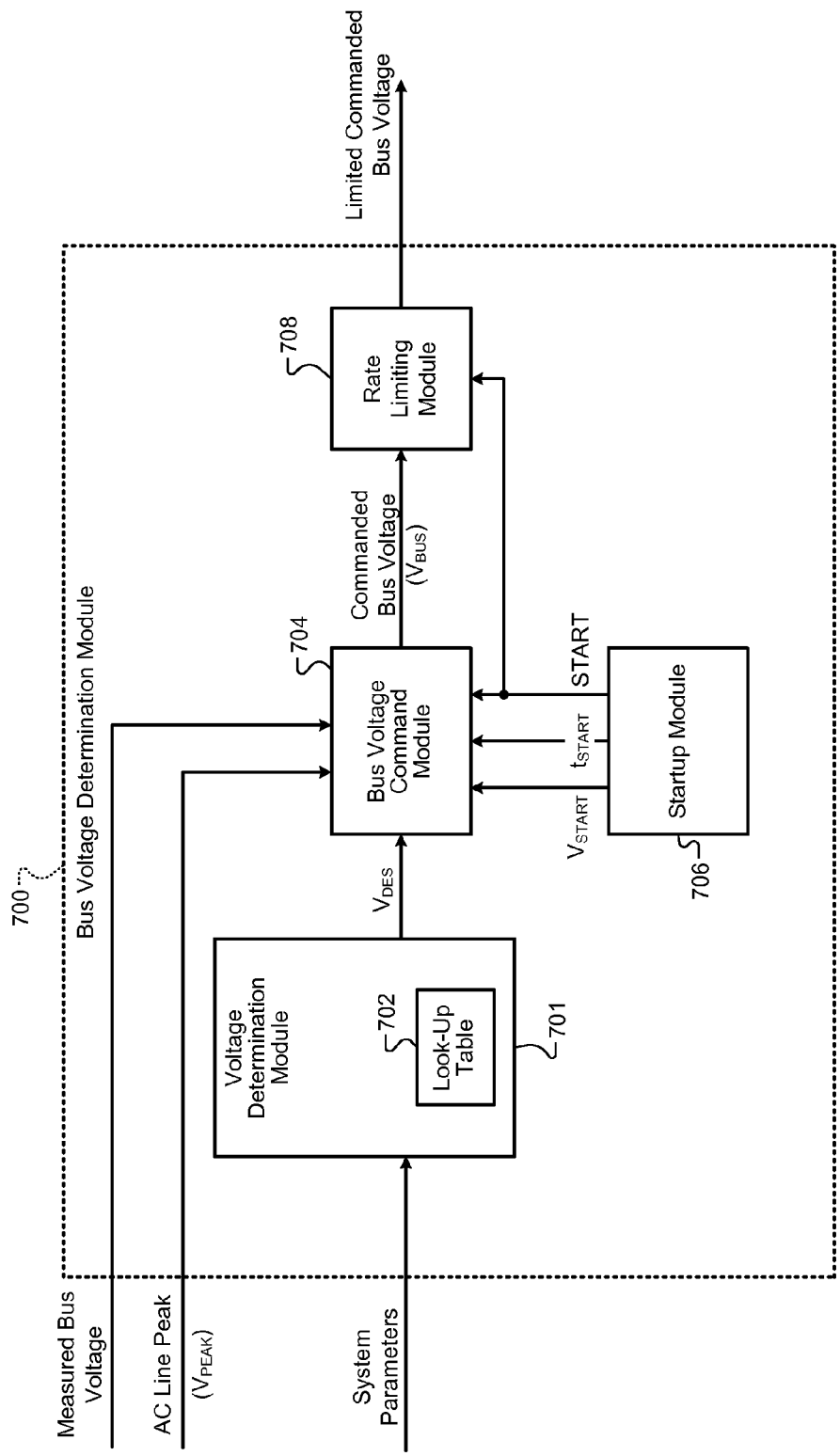
FIG. 7 is a functional block diagram of an example bus voltage determination module.

Referring now to FIG. 7, an example bus voltage determination module 700 is shown in more detail. In various implementations, the bus voltage determination module 700 may be implemented in the supervisor control module 270. The bus voltage determination module 700 includes a voltage determination module 701, a bus voltage command module 704, a startup module 706, and a rate limiting module 708. The voltage determination module 701 may include a look-up table 702.

The voltage determination module 701 receives a plurality of system parameters. The voltage determination module 701 determines $V_{DES}$ based on at least one of the plurality of system parameters. The plurality of system parameters may include, for example only, actual and commanded compressor speed, actual and estimated inverter output power, actual and estimated drive input power, input and output current, percentage out of volts (OOV), drive input voltage, inverter output voltage, estimated motor torque, a demand from the condenser 104, and various temperatures.

For example only, the various temperatures may include temperatures of the PFC module 204, the inverter power module 208, one or more circuit boards, a scroll of the compressor, and the compressor motor. Drive input power is the electrical power flowing into the PFC module 204 as measured between the first and second AC input terminals 302 and 304 (see FIG. 3a). The drive input power can be measured using a power meter with the line input current and voltage measured between the first and second AC input terminals 302 and 304 as the two inputs to the meter.

The inverter output power is measured at the 3 drive output terminals of the inverter power module 208 (see FIG. 4a). The inverter output power can be determined by measuring each phase current (Ia, Ib, and Ic) and each line to line voltage (Va-Vb, Vb-Vc, and Vc-Va). The difference between the inverter output power (power going to the motor 400) and the drive input power (power entering the PFC module 204) represents the power consumed by the PFC module 204 and the inverter power module 208.

For example only, as power (e.g., actual and estimated inverter output power, actual and estimated drive input power) increases, $V_{DES}$ may be increased or decreased. As current (e.g., input current, output current) decreases, $V_{DES}$ may be increased or decreased. As line voltage (e.g., drive input voltage and inverter output voltage) decreases, $V_{DES}$ may be decreased. As motor speed (e.g., actual and commanded compressor speed and percentage OOV) increases, $V_{DES}$ may be increased. As torque (e.g., motor torque in the compressor 102) increases, $V_{DES}$ may be increased. As selected ones of the various temperatures decrease, $V_{DES}$ may be increased. Furthermore, changes in any combination of the above described parameters may affect $V_{DES}$.

The look-up table 702 may store predetermined relationships between $V_{DES}$, AC peak voltage $V_{PEAK}$, and combinations of the plurality of system parameters. The look-up table 702 may include data corresponding to a predetermined range of $V_{DES}$. For example only, the predetermined range for $V_{DES}$ may be 355 V-410 V. The look-up table 702 may also include data corresponding to additional values of $V_{DES}$.

The bus voltage command module 704 receives $V_{PEAK}$, the peak voltage of the AC line signal. The peak voltage of the AC line signal may be determined by simply monitoring the voltage of the AC line signal (such as by periodic digital sampling) and selecting the highest voltage as the peak voltage. However, this method may be susceptible to noise and other transients, which may cause the measured peak voltage to be artificially high. Alternatively, $V_{PEAK}$ may be determined by multiplying a mean absolute value of the AC line signal by π/2. The mean absolute value of the AC line signal is much less susceptible to noise and other transients. $V_{PEAK}$ may be determined at predetermined intervals, such as once per AC line cycle.

The bus voltage command module 704 determines $V_{BUS}$ based on $V_{DES}$ from the voltage determination module 701. As discussed further below, the bus voltage command module 704 may adjust $V_{BUS}$ based on one or more other parameters, such as $V_{PEAK}$, $V_{HOLD}$, and the measured bus voltage.

When the PFC module 204 is off, the measured bus voltage may be less than $V_{PEAK}$ because of passive operation of diodes within the PFC module 204. After the PFC module 204 is initially turned on, the startup module 706 generates a start signal having a first state (e.g., high or "1"). The startup module 706 may maintain the start signal at the first state for a predetermined startup period ($t_{START}$). For example only, $t_{START}$ may be approximately 15 seconds. The start signal is sent to the bus voltage command module 704. To avoid a discontinuity, the bus voltage command module 704 may set $V_{BUS}$ to the measured bus voltage when the start signal having the first state is received.

The start signal may also be sent to the rate limiting module 708. The rate limiting module 708 may generate a limited commanded bus voltage by applying a rate limit to $V_{BUS}$ from the bus voltage command module 704. However, when the rate limiting module 708 receives the start signal having the first state, the rate limiting module 708 initializes the limited commanded bus voltage to $V_{BUS}$, which was set based on the measured bus voltage. After initializing the limited commanded bus voltage to $V_{BUS}$, the rate limiting module 708 returns to generating the limited commanded bus voltage by applying a rate limit to changes in $V_{BUS}$.

The limited commanded bus voltage is used to control the PFC module 204. For example only, the rate limiting module 708 may output the limited commanded bus voltage to the PFC control module 250. The rate limiting module 708 may implement the rate limiting by adjusting the limited commanded bus voltage toward $V_{BUS}$ after each time interval of a specified length. The amount by which the limited commanded bus voltage can change during each time interval is limited to a specified increment. The average rate applied by the rate limiting module 708 is then a ratio of the specified increment to the specified length.

The rate applied by the rate limiting module 708 may be asymmetric—with a higher rate in one direction than another (e.g., decreasing is limited to a higher rate than increasing). In various implementations, the rate limiting may be non-linear.

After beginning to generate the start signal having the first state, the startup module 706 may provide a startup voltage $V_{START}$ to the bus voltage command module 704. $V_{START}$ may be chosen as a minimum voltage that will create stable start conditions for the PFC module 204. For example only, $V_{START}$ may be approximately 410 V. While the start signal remains in the first state, the bus voltage command module 704 sets $V_{BUS}$ to be equal to $V_{START}$.

Because the rate limiting module 708 applies a rate limit, the limited commanded bus voltage begins ramping to the new value of $V_{BUS}$, $V_{START}$. For example only, if $V_{START}$ is 410 V, and the measured bus voltage is 325 V, the rate limiting module 708 may ramp the limited commanded bus voltage from 325 V to 410 V.

After the predetermined startup period $t_{START}$, the startup module 706 transitions the start signal to a second state (e.g., low, or "0"). When the start signal has the second state, the bus voltage command module 704 begins to control $V_{BUS}$ based on $V_{DES}$.

The bus voltage command module 704 may apply a lower limit to $V_{DES}$ when determining $V_{BUS}$. The PFC module 204 may be configured to boost the DC bus voltage to greater than $V_{PEAK}$. For example only, the PFC module 204 may be able to maintain a limited commanded bus voltage that is greater than $V_{PEAK}$ plus an offset voltage.

By contrast, the PFC module 204 may not be able to produce a limited commanded bus voltage that is less than the offset voltage plus $V_{PEAK}$. To produce such a limited commanded bus voltage, the PFC module 204 may be switched off and on. Switching the PFC module 204 off and on may create unstable conditions, and result in trips or faults.

Therefore, when determining $V_{BUS}$, the bus voltage command module 704 may apply a lower limit that is equal to $V_{PEAK}$ plus the offset voltage. For example only, the offset voltage may be approximately 30 V. In other words, the bus voltage command module 704 may increase $V_{BUS}$ to the lower limit when the lower limit is greater than $V_{BUS}$. The bus voltage command module 704 also increases $V_{BUS}$ to the value of $V_{DES}$ when $V_{DES}$ is greater than $V_{BUS}$.

The bus voltage command module 704 may prevent a reduction in $V_{BUS}$ unless a predetermined period has passed since $V_{BUS}$ was last increased. Further, at the end of the predetermined period, the bus voltage command module 704 may determine the lower limit based on not the current value of $V_{PEAK}$, but the highest value of $V_{PEAK}$ observed within the predetermined period. This prevents prematurely decreasing $V_{BUS}$ when an unusually low value of $V_{PEAK}$ was observed at the end of the predetermined period. For example only, the predetermined period may be approximately 10 seconds.

Figure 8:
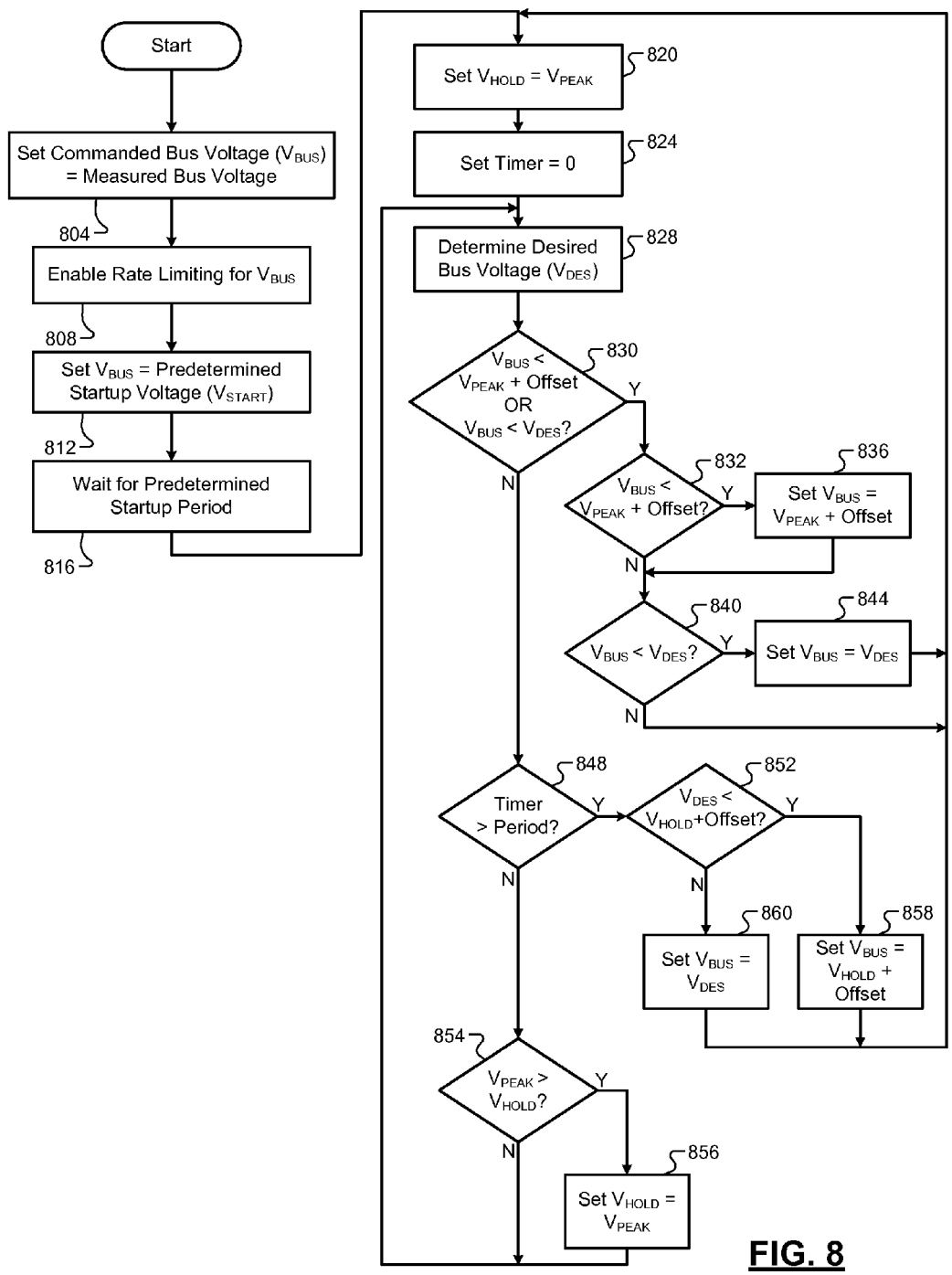
FIG. 8 is a flow diagram of example method for determining the DC bus voltage.

Referring now to FIG. 8, a flow diagram depicts example operation of the bus voltage determination module 700. Control begins at 804, where control sets $V_{BUS}$ equal to the measured bus voltage. Control then enables rate limiting of $V_{BUS}$ at 808. When rate limiting is enabled, control applies a rate limit to changes in $V_{BUS}$ and outputs the result as a limited commanded bus voltage.

At 812, control sets $V_{BUS}$ equal to a predetermined startup voltage $V_{START}$. At 816, control waits for a predetermined startup period $t_{START}$. For example only, $t_{START}$ may be approximately 10 seconds, and $V_{START}$ may be approximately 410 V. As stated above, control rate limits the transition of $V_{BUS}$ from the measured bus voltage to $V_{START}$.

Control continues at 820 and sets a peak hold voltage $V_{HOLD}$ equal to the current peak AC voltage $V_{PEAK}$. At 824, control initializes a timer to zero, which allows the timer to track a time period elapsed since the timer was last initialized. At 828, control determines the desired bus voltage $V_{DES}$ based on one or more system parameters.

At 830, control determines whether: (1) $V_{BUS}$ is less than a sum of $V_{PEAK}$ and an offset voltage; and/or (2) $V_{BUS}$ is less than $V_{DES}$. If either of these conditions is true, control transfers to 832. If both of the conditions are false, control continues to 848.

At 832, control determines whether $V_{BUS}$ is less than the sum of $V_{PEAK}$ and the offset voltage. If true, control sets $V_{BUS}$ equal to the sum of $V_{PEAK}$ and the offset voltage in 836 and continues to 840; otherwise, control transfers to 840.

At 840, control determines whether $V_{BUS}$ is less than $V_{DES}$. If true, control sets $V_{BUS}$ equal to $V_{DES}$ at 844 and returns to 820; if false, control simply returns to 820. In this manner, control increases $V_{BUS}$ and resets the timer when $V_{BUS}$ is less than either $V_{DES}$ or the sum of $V_{PEAK}$ and the offset voltage.

At 848, control determines whether the timer is greater than a predetermined period. If true, control transfers to 852; if false, control continues to 854. For example only, the predetermined period may be approximately 10 seconds. At 854, control determines whether $V_{PEAK}$ is greater than $V_{HOLD}$. If true, control updates $V_{HOLD}$ to be equal to $V_{PEAK}$ at 868 and returns to 828; if false, control simply returns to 828. In this manner, $V_{HOLD}$ tracks the highest $V_{PEAK}$ observed since $V_{HOLD}$ was initialized at 820.

At 852, control determines whether $V_{DES}$ is less than a sum of $V_{HOLD}$ and the voltage offset. If true, control sets $V_{BUS}$ equal to the sum of $V_{HOLD}$ and the offset voltage at 858 and returns to 820; if false, control sets $V_{BUS}$ equal to $V_{DES}$ at 860 and returns to 820. In other words, each time the predetermined period expires (as measured by the timer at 848), $V_{BUS}$ can be lowered to the greater of $V_{DES}$ and the sum of $V_{HOLD}$ (the highest $V_{PEAK}$ observed within that predetermined period) and the offset voltage. The predetermined period may be selected to be long enough that $V_{HOLD}$ is relatively steady while not maintaining $V_{HOLD}$ at an artificially high level for too long.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A controller comprising:
   a voltage determination module that determines a desired direct current (DC) bus voltage for a DC bus electrically connected between a power factor correction (PFC) module and an inverter power module that drives a motor,
   wherein the voltage determination module determines the desired DC bus voltage based on at least one of a torque of the motor and a speed of the motor;
   a bus voltage command module that determines a commanded bus voltage based on the desired DC bus voltage; and
   a PFC control module that controls the PFC module to create a voltage on the DC bus that is based on the commanded bus voltage.

2. The controller of claim 1 wherein the bus voltage command module sets the commanded bus voltage equal to a measured voltage of the DC bus when the controller transitions from an off state to an on state.

3. The controller of claim 2 further comprising a rate limiting module that generates a rate limited voltage, wherein:
   the PFC control module controls the PFC module to create the rate limited voltage on the DC bus, and
   the rate limited voltage is equal to the measured voltage of the DC bus when the controller transitions from the off state to the on state.

4. The controller of claim 3 wherein after the controller transitions from the off state to the on state:
   the bus voltage command module sets the commanded bus voltage equal to a predetermined startup voltage for a predetermined startup period, and
   the rate limiting module ramps the rate limited voltage toward the commanded bus voltage during the predetermined startup period.

5. The controller of claim 1 wherein:
   the bus voltage command module increases the commanded bus voltage to a greater one of the desired DC bus voltage and a first sum when the commanded bus voltage is less than either the desired DC bus voltage or the first sum, and
   the first sum is equal to a predetermined offset plus a peak voltage of an AC line powering the PFC module.

6. The controller of claim 5 wherein:
   the bus voltage command module decreases the commanded bus voltage to a greater one of the desired DC bus voltage and a second sum after a predetermined period in which the commanded bus voltage was not increased, and
   the second sum is equal to the predetermined offset plus a highest value of the peak voltage observed during the predetermined period.

7. A system comprising:
   the controller of claim 1;
   the PFC module;
   the inverter power module; and
   a condenser inverter module that drives a condenser fan using power from the DC bus.

8. A system comprising:
   the controller of claim 1;
   the PFC module;
   the inverter power module;
   a condenser inverter module that drives a condenser fan using power from a second DC bus; and
   an electrical linkage between the DC bus and the second DC bus that provides excess power from the DC bus to the second DC bus.

9. A method comprising:
   converting incoming AC power into DC power using a power factor correction (PFC) module;
   converting the DC power into AC power using an inverter power module;
   driving a motor using the AC power;
   determining a desired voltage for the DC power based on at least one of torque of the motor and a speed of the motor;
   generating a commanded voltage based on the desired voltage; and
   controlling the PFC module to produce the DC power at a voltage based on the commanded voltage.

10. The method of claim 9 further comprising setting the commanded voltage equal to a startup voltage for a predetermined startup period upon power-on.

11. The method of claim 10 further comprising:
generating a limited commanded voltage by limiting a rate of change of the commanded voltage;
controlling the PFC module to produce the DC power at the limited commanded voltage; and
at a beginning of the predetermined startup period, initializing the limited commanded voltage to a measured voltage of the DC power.

12. The method of claim 9 further comprising maintaining the commanded voltage to be greater than or equal to the desired voltage.

13. The method of claim 12 further comprising:
determining a threshold voltage based on a sum of a predetermined positive offset voltage and a measured peak voltage of the incoming AC power; and
maintaining the commanded voltage to be greater than or equal to the threshold voltage.

14. The method of claim 9 further comprising:
increasing the commanded voltage to the desired voltage when the desired voltage is greater than the commanded voltage; and
increasing the commanded voltage to a first threshold voltage when the first threshold voltage is greater than the commanded voltage,
wherein the first threshold voltage is based on a sum of a predetermined positive offset voltage and a measured peak voltage of the incoming AC power.

15. The method of claim 14 further comprising selectively decreasing the commanded voltage to a greater one of a second threshold voltage and the desired voltage after a predetermined period has elapsed in which the commanded voltage has not been increased,
wherein the second threshold voltage is based on a sum of the offset voltage and a highest value of the measured peak voltage of the incoming AC power observed throughout the predetermined period.

* * * * *